(12) United States Patent
Chiba et al.

(10) Patent No.: US 11,718,741 B2
(45) Date of Patent: Aug. 8, 2023

(54) HEAT-RESISTANT CROSSLINKED FLUORORUBBER FORMED BODY AND METHOD OF PRODUCING THE SAME, SILANE MASTERBATCH, MASTERBATCH MIXTURE, AND HEAT-RESISTANT PRODUCT

(71) Applicant: FURUKAWA ELECTRIC CO., LTD., Tokyo (JP)

(72) Inventors: Hiroki Chiba, Tokyo (JP); Masaki Nishiguchi, Tokyo (JP); Arifumi Matsumura, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 354 days.

(21) Appl. No.: 16/886,427

(22) Filed: May 28, 2020

(65) Prior Publication Data

US 2020/0291216 A1    Sep. 17, 2020

Related U.S. Application Data

(63) Continuation of application No. PCT/JP2019/027163, filed on Jul. 9, 2019.

(30) Foreign Application Priority Data

Jul. 10, 2018    (JP) .................. 2018-131048

(51) Int. Cl.
| | |
|---|---|
| *C08L 27/16* | (2006.01) |
| *C08K 3/22* | (2006.01) |
| *C08K 3/26* | (2006.01) |
| *C08K 3/36* | (2006.01) |
| *C08K 5/14* | (2006.01) |
| *C08L 23/26* | (2006.01) |
| *C08L 27/18* | (2006.01) |
| *C08L 51/04* | (2006.01) |

(52) U.S. Cl.
CPC ............... *C08L 27/16* (2013.01); *C08K 3/22* (2013.01); *C08K 3/26* (2013.01); *C08K 3/36* (2013.01); *C08K 5/14* (2013.01); *C08L 23/26* (2013.01); *C08L 27/18* (2013.01); *C08L 51/04* (2013.01); *C08K 2003/2296* (2013.01); *C08K 2003/265* (2013.01); *C08L 2201/08* (2013.01); *C08L 2203/206* (2013.01); *C08L 2310/00* (2013.01); *C08L 2312/08* (2013.01)

(58) Field of Classification Search
CPC .......... C08L 27/16; C08L 23/26; C08L 27/18; C08L 51/04; C08L 2201/08; C08L 2203/206; C08L 2310/00; C08L 2312/08; C08K 3/22; C08K 3/26; C08K 3/36; C08K 5/14; C08K 2003/2296; C08K 2003/265
USPC ........................................... 525/199
See application file for complete search history.

(56) References Cited

U.S. PATENT DOCUMENTS

| | | | |
|---|---|---|---|
| 2018/0346664 A1* | 12/2018 | Nishiguchi | ............. C08L 27/18 |
| 2018/0346700 A1 | 12/2018 | Nishiguchi et al. | |

FOREIGN PATENT DOCUMENTS

| | | | | |
|---|---|---|---|---|
| JP | 1-190739 A | 7/1989 | | |
| JP | 2-209942 A | 8/1990 | | |
| JP | 6-306245 A | 11/1994 | | |
| JP | 2015-86385 A | 5/2015 | | |
| JP | 2016-37515 A | 3/2016 | | |
| JP | 2017-141384 A | 8/2017 | | |
| JP | 2017-179236 A | 10/2017 | | |
| WO | WO 2017/138642 A1 | 8/2017 | | |
| WO | WO-2017138642 A1 * | 8/2017 | ............. | B29B 7/005 |
| WO | WO 2017/154585 A1 | 9/2017 | | |

OTHER PUBLICATIONS

International Search Report for PCT/JP2019/027163 (PCT/ISA/210) dated Oct. 8, 2019.
Written Opinion of the International Searching Authority for PCT/JP2019/027163 (PCT/ISA/237) dated Oct. 8, 2019.

* cited by examiner

*Primary Examiner* — Ling Siu Choi
*Assistant Examiner* — Ronald Grinsted
(74) *Attorney, Agent, or Firm* — Birch, Stewart, Kolasch & Birch, LLP

(57) ABSTRACT

A method of producing a heat-resistant crosslinked fluororubber formed body, including: step (1) melt-mixing, with respect to 100 mass parts of base rubber containing 60 to 99 mass % of fluororubber and 1 to 40 mass % of ethylene-based copolymer resin modified with unsaturated carboxylic acid, 0.003 to 0.5 mass parts of organic peroxide, 0.5 to 400 mass parts of inorganic filler, 2 to 15 mass parts of silane coupling agent, and silanol condensation catalyst, in which the step (1) includes, step (a) melt-mixing all or part of the base rubber, the organic peroxide, the inorganic filler and the silane coupling agent at a temperature equal to or higher than a decomposition temperature of the organic peroxide, and step (b) melt-mixing a remainder of the base rubber, and the silanol condensation catalyst, to melt-mix the thus-modified ethylene-based copolymer resin in at least one of the steps (a) and (b).

20 Claims, No Drawings

HEAT-RESISTANT CROSSLINKED FLUORORUBBER FORMED BODY AND METHOD OF PRODUCING THE SAME, SILANE MASTERBATCH, MASTERBATCH MIXTURE, AND HEAT-RESISTANT PRODUCT

CROSS-REFERENCE TO RELATED APPLICATIONS

This application is a Continuation of PCT International Application No. PCT/JP2019/027163 filed on Jul. 9, 2019, which claims priority under 35 U.S.C. § 119 (a) to Japanese Patent Application No. 2018-131048 filed in Japan on Jul. 10, 2018. Each of the above applications is hereby expressly incorporated by reference, in its entirety, into the present application.

TECHNICAL FIELD

The present invention relates to a heat-resistant crosslinked fluororubber formed body and a method of producing the same, a silane masterbatch, a masterbatch mixture, and a heat-resistant product.

BACKGROUND ART

Wiring materials, such as insulated wires, cables, cords, optical fiber core wires or optical fiber cords (optical fiber cables), each of which can be used in an electrical- or electronic-equipment field, and an industrial field, are required to have various characteristics, such as flame retardancy, heat resistance and mechanical characteristics (for example, tensile properties and abrasion resistance (or wear resistance)).

Further, by extended periods of use, the temperature of these wiring materials is sometimes raised to the range of 80 to 105° C., further to about 125° C., and even to 150° C. or more depending on the intended use or the like. Thus, heat resistance for the extended periods of use is also sometimes required. In this case, crosslinked materials of rubbers or resins are to be used as the wiring materials. As methods of crosslinking rubbers or resins, electron beam crosslinking methods or chemical crosslinking methods are generally utilized.

Conventionally, as methods for crosslinking polyolefin resins, such as polyethylene, known so far include: electron beam crosslinking methods in which the resin is crosslinked by irradiation with electron beams, and chemical crosslinking methods, such as a crosslinking method in which heat is applied after forming, to decompose organic peroxide or the like and to allow a crosslinking reaction, and a silane crosslinking method.

The silane crosslinking method means a method of obtaining a crosslinked resin, by obtaining a silane-grafted resin by allowing a grafting reaction of a silane coupling agent having an unsaturated group with a resin in the presence of organic peroxide, and then bringing the silane-grafted resin into contact with moisture in the presence of a silanol condensation catalyst.

Among the above-described crosslinking methods, in particular, the silane crosslinking method requires no special facilities in many cases, and therefore can be employed in a wide range of fields.

Incidentally, heat resistance higher than the above-described heat resistance is required for electric wire members or the like to be used in microwave ovens or gas ranges, or heat-resistant parts or the like of automobiles among the above-described wiring materials. As a resin that may meet this requirement, fluororubber that may exhibit a heat-resistant temperature of 200° C. or higher is widely used in the above-described electric wire members or the like.

In the forgoing fluororubber, crosslinked products are also desired as is the case with the above-described polyolefin resins. For example, Patent Literature 1 proposes a method of producing a fluororubber crosslinked product in which the fluororubber is crosslinked by blending a crosslinking agent for the fluororubber, such as an organic peroxide or the like in a composition that is obtained by blending and reacting, together with a diene-based rubber and a fluororubber, a crosslinking agent for the diene-based rubber, such as an organic peroxide or the like. Patent Literature 2 proposes a method of crosslinking a fluororubber composition by polyol vulcanization. Patent Literature 3 proposes a method of crosslinking a fluororubber composition by organic peroxide vulcanization.

However, it is difficult to subject a fluororubber to silane crosslinking by the silane crosslinking method. The fluororubber crosslinked product cannot be obtained only by simply applying a fluororubber in the above-described silane crosslinking method. Patent Literature 4 proposes a method of producing a heat-resistant crosslinked fluororubber formed body in which a special step is performed using both a fluororubber-containing base rubber and an inorganic filler in the silane crosslinking method.

CITATION LIST

Patent Literatures

Patent Literature 1: JP-A-01(Heisei 01)-190739 ("JP-A" means unexamined published Japanese patent application)
Patent Literature 2: JP-A-02-209942
Patent Literature 3: JP-A-06-306245
Patent Literature 4: International Publication (WO) No. 2017/138642

SUMMARY OF INVENTION

Technical Problem

The wiring materials or the like are sometimes used in an environment with violent vibration (for example, wiring materials to be used around the engine of the automobile (or a car), wiring materials to be used in an aircraft, wiring materials to be used in a robot interior portion or moving portion, or the like). The wiring materials or the like to be used in this environment are required to have more advanced abrasion resistance.

The present invention is contemplated for providing a heat-resistant crosslinked fluororubber formed body which exhibits still advanced abrasion resistance even in spite of the rubber formed body, and a method of producing the same.

In addition, the present invention is contemplated for providing a silane masterbatch or a masterbatch mixture, from which the heat-resistant crosslinked fluororubber formed body can be formed.

Further, the present invention is contemplated for providing a heat-resistant product containing the heat-resistant crosslinked fluororubber formed body obtained according to the production method of the heat-resistant crosslinked fluororubber formed body.

Solution to Problem

The inventors of the present invention have found that in the silane crosslinking method, a heat-resistant crosslinked fluororubber formed body which exhibits still advanced abrasion resistance even in spite of the rubber formed body can be produced, by a specific production method in which a silanol condensation catalyst is mixed in a specific mixing mode (manner) with a silane masterbatch prepared by using a base rubber containing a fluororubber and an ethylene-based copolymer resin modified with an unsaturated carboxylic acid, in a specific ratio.

The inventors of the present invention have further repeated investigations based on these findings and completed the present invention.

That is, the above-described problems of the present invention are solved by the following means.

<1>

A method of producing a heat-resistant crosslinked fluororubber formed body, including the following steps (1), (2) and (3):

Step (1): a step of obtaining a reaction composition containing a silane crosslinkable rubber by melt-mixing, with respect to 100 parts by mass of a base rubber containing 60 to 99% by mass of a fluororubber and 1 to 40% by mass of an ethylene-based copolymer resin modified with an unsaturated carboxylic acid, 0.003 to 0.5 parts by mass of an organic peroxide, 0.5 to 400 parts by mass of an inorganic filler, 2 to 15 parts by mass of a silane coupling agent having a grafting reaction site that is capable of being subjected to a grafting reaction with said base rubber in the presence of radicals generated from said organic peroxide, and a silanol condensation catalyst, Step (2): a step of obtaining a formed body by forming the reaction composition, and Step (3): a step of obtaining the heat-resistant crosslinked fluororubber formed body by bringing the formed body into contact with water, wherein, when the step (1) is performed, in a case of melt-mixing all of the base rubber in the following step (a), the step (1) includes the following step (a) and step (c), or in a case of melt-mixing a part of the base rubber in the following step (a), the step (1) includes the following step (a), step (b) and step (c), and the ethylene-based copolymer resin modified with an unsaturated carboxylic acid is melt-mixed in at least one of the following steps (a) and (b):

Step (a): a step of preparing a silane masterbatch containing a silane crosslinkable rubber, by melt-mixing all or part of the base rubber, the organic peroxide, the inorganic filler and the silane coupling agent at a temperature equal to or higher than a decomposition temperature of said organic peroxide, and by graft-reacting the grafting reaction site and the base rubber due to radicals generated from said organic peroxide, Step (b): a step of preparing a catalyst masterbatch, by melt-mixing a remainder of the base rubber, and the silanol condensation catalyst, and Step (c): a step of obtaining the reaction composition, by melt-mixing the silane masterbatch and the silanol condensation catalyst or the catalyst masterbatch.

<2>

The method of producing a heat-resistant crosslinked fluororubber formed body described in the item <1>, wherein the base rubber contains 60 to 97% by mass of the fluororubber and 3 to 40% by mass of the ethylene-based copolymer resin modified with an unsaturated carboxylic acid.

<3>

The method of producing a heat-resistant crosslinked fluororubber formed body described in the item <1> or <2>, wherein the ethylene-based copolymer resin modified with an unsaturated carboxylic acid is melt-mixed in the step (a).

<4>

The method of producing a heat-resistant crosslinked fluororubber formed body described in any one of the items <1> to <3>, wherein the fluororubber includes a fluorinated vinylidene rubber or a tetrafluoroethylene/propylene copolymer rubber, or a combination thereof.

<5>

The method of producing a heat-resistant crosslinked fluororubber formed body described in any one of the items <1> to <4>, wherein the fluororubber is a tetrafluoroethylene/propylene copolymer rubber.

<6>

The method of producing a heat-resistant crosslinked fluororubber formed body described in any one of the items <1> to <5>, wherein the ethylene-based copolymer resin modified with an unsaturated carboxylic acid includes an ethylene/vinyl acetate copolymer resin modified with an unsaturated carboxylic acid, an ethylene/ethyl (meth)acrylate copolymer resin modified with an unsaturated carboxylic acid, or an ethylene/methyl (meth)acrylate copolymer resin modified with an unsaturated carboxylic acid, or a combination thereof.

<7>

The method of producing a heat-resistant crosslinked fluororubber formed body described in any one of the items <1> to <6>, wherein the ethylene-based copolymer resin modified with an unsaturated carboxylic acid is an ethylene/vinyl acetate copolymer resin modified with an unsaturated carboxylic acid.

<8>

The method of producing a heat-resistant crosslinked fluororubber formed body described in any one of the items <1> to <7>, wherein the base rubber includes an ethylene/vinyl acetate copolymer resin, an ethylene/(meth)acrylic acid ester copolymer resin, an ethylene/(meth)acrylic acid copolymer resin or an acrylic rubber, or a combination thereof.

<9>

The method of producing a heat-resistant crosslinked fluororubber formed body described in any one of the items <1> to <8>, wherein the inorganic filler includes silica, calcium carbonate, zinc oxide, or a calcined clay, or a combination thereof.

<10>

The method of producing a heat-resistant crosslinked fluororubber formed body described in any one of the items <1> to <9>, wherein the inorganic filler includes silica and zinc oxide.

<11>

The method of producing a heat-resistant crosslinked fluororubber formed body described in any one of the items <1> to <10>, wherein the base rubber contains a fluororesin.

<12>

The method of producing a heat-resistant crosslinked fluororubber formed body described in any one of the items <1> to <11>, wherein the remainder of the base rubber contains a fluororesin.

<13>

The method of producing a heat-resistant crosslinked fluororubber formed body described in the item <11> or <12>, wherein a melting point of the fluororesin is 250° C. or less.

<14>

The method of producing a heat-resistant crosslinked fluororubber formed body described in any one of the items <11> to <13>, wherein the fluororesin includes an ethylene/tetrafluoroethylene/hexafluoropropylene copolymer resin, an ethylene/tetrafluoroethylene copolymer resin, or a polyfluorinated vinylidene resin, or a combination thereof.

<15>

The method of producing a heat-resistant crosslinked fluororubber formed body described in any one of the items <11> to <14>, wherein a content rate of the fluororesin is 3 to 15% by mass, with respect to 100% by mass of the base rubber.

<16>

A silane masterbatch for use in producing a masterbatch mixture prepared by mixing, with respect to 100 parts by mass of a base resin containing 60 to 99% by mass of a fluororubber and 1 to 40% by mass of an ethylene-based copolymer resin modified with an unsaturated carboxylic acid, a silane crosslinkable rubber grafted with a silane coupling agent of 2 to 15 parts by mass, 0.5 to 400 parts by mass of an inorganic filler with respect to 100 parts by mass of said base resin, and a silanol condensation catalyst, wherein the silane masterbatch includes the silane crosslinkable rubber subjected the silane coupling agent and the base rubber to a grafting reaction, by radicals generated from the organic peroxide, by melt-mixing all or part of the base rubber, said organic peroxide, the inorganic filler, and the silane coupling agent.

<17>

A masterbatch mixture containing the silane masterbatch described in the item <16> and a silanol condensation catalyst.

<18>

A heat-resistant crosslinked fluororubber formed body produced by the method of producing a heat-resistant crosslinked fluororubber formed body described in any one of the items <1> to <15>.

<19>

A heat-resistant product comprising the heat-resistant crosslinked fluororubber formed body described in the item <18>.

<20>

The heat-resistant product described in the item <19>, wherein the heat-resistant crosslinked fluororubber formed body is a coated layer of an electric wire or an optical fiber cable.

Note that, in this specification, numerical expressions in a style of " . . . to . . . " will be used to indicate a range including the lower and upper limits represented by the numerals given before and after "to", respectively.

Effects of the Invention

The method of producing a heat-resistant crosslinked fluororubber formed body according to the present invention can produce a heat-resistant crosslinked fluororubber formed body that exhibits advance abrasion resistance in spite of the rubber formed body. Further, the present invention can provide a silane masterbatch and a masterbatch mixture that allows formation of this heat-resistant crosslinked fluororubber formed body. Furthermore, the present invention can provide a heat-resistant product comprising the above-described heat-resistant crosslinked fluororubber formed body.

Other and further features and advantages of the invention will appear more fully from the following description.

MODE FOR CARRYING OUT THE INVENTION

First, each component to be used in the present invention will be explained.

<Base Rubber>

The base rubber to be used in the present invention contains, as essential components, a fluororubber and an ethylene-based copolymer resin modified with an unsaturated carboxylic acid. By containing the fluororubber and the ethylene-based copolymer resin modified with an unsaturated carboxylic acid in the base rubber, excellent abrasion resistance can be given to the heat-resistant crosslinked fluororubber formed body. Further, heat resistance that does not melt even at high temperatures can be given thereto. Herein, the expression "heat resistance that does not melt even at high temperatures" means a property that does not melt, preferably a property that can keep a shape or a strength, preferably at the temperature of 200° C., and more preferably at the temperature of 200° C. or higher. More specifically, this means that the elongation percentage at 200° C. in the hot set test described below satisfy 100% or less. The above-described temperature has no upper limit, and 300° C. or lower is practical.

—Fluororubber—

The fluororubber is not particularly limited, and use can be made of ordinary fluororubber that has been used so far in a heat-resistant rubber formed body. The fluororubber preferably has a site capable of grafting reaction with a grafting reaction site of a silane coupling agent in the presence of radicals generated from an organic peroxide, examples of said site capable of grafting reaction include an unsaturated bond site of the carbon chain, and a carbon atom having a hydrogen atom in a main chain or at the end thereof.

Such a fluororubber is not particularly limited, and specific examples thereof include copolymer rubber between fluorine-containing monomers, such as perfluorohydrocarbon including tetrafluoroethylene and hexafluoropropylene, and partially fluorinated hydrocarbon (e.g. vinylidene fluoride), and further copolymer rubber of these perfluorohydrocarbon and/or fluorine-containing monomers and a hydrocarbon, such as ethylene and/or propylene.

Specific examples include tetrafluoroethylene/propylene copolymer rubber (FEPM), tetrafluoroethylene/fluoropropylene (for example, hexafluoropropylene) copolymer rubber, tetrafluoroethylene/perfluorovinyl ether copolymer rubber (FFKM), vinylidene fluoride rubber (FKM, for example, vinylidene fluoride/hexafluoropropylene copolymer rubber).

Further, examples thereof also include the above-described copolymer rubber of perfluorohydrocarbon and/or fluorine-containing monomers and chloroprene and/or chlorosulfonated polyethylene.

Among these fluororubbers, preferred are vinylidene fluoride rubber or tetrafluoroethylene/propylene copolymer rubber, or a combination thereof. More preferred is tetrafluoroethylene/propylene copolymer rubber.

A content of the fluorine atom in the fluororubber (mass ratio of the fluorine atom with regard to the total amount of the fluororubber) is not particularly limited, and is preferably 25% by mass or more, more preferably 40% by mass or more, and further preferably 50% by mass or more. An upper limit of the fluorine content is a mass ratio when all of hydrogen atoms of a polymer before being fluorinated, and capable of being replaced by the fluorine atom are replaced by the fluorine atom, and is unable to be unambiguously determined as this varies depending on a molecular weight of the polymer before being fluorinated, the number of hydrogen atoms that can be replaced by the fluorine atom, or the like. For example, the upper limit can be taken as 75% by mass.

In the present invention, the fluorine content is determined according to a calculated value in synthesis, or a potassium carbonate pyrohydrolysis method. Specific examples of the potassium carbonate pyrohydrolysis method include the method described by Makoto Noshiro et al., NIPPON KAGAKU KAISHI, 6, 1236 (1973).

The fluororubber may be appropriately synthesized, or a commercially available product may be used.

Examples of the tetrafluoroethylene/propylene copolymer rubber include AFLAS (trade name, manufactured by AGC Ashasi Glass Co., Ltd.). Examples of the tetrafluoroethylene/perfluorovinyl ether copolymer rubber include KALREZ (trade name, manufactured by DuPont). Examples of the vinylidene fluoride rubber include VITON (trade name, manufactured by DuPont), DAI-EL (trade name, manufactured by Daikin Industries, Ltd.), DYNEON (trade name, manufactured by 3M Company), and TECNOFLON (trade name, manufactured by Solvay Specialty).

With respect to 100% by mass of the base rubber, the content rate of the fluororubber is 60 to 99% by mass, preferably 60 to 97% by mass, and more preferably 65 to 90% by mass. If the content of the fluororubber is 60 to 99% by mass, heat resistance, abrasion resistance and the like can be given to the formed body.

—Ethylene-Based Copolymer Resin Modified with an Unsaturated Carboxylic Acid—

The base rubber contains an ethylene-based copolymer resin modified with an unsaturated carboxylic acid. In the production method of the present invention, by containing the ethylene-based copolymer resin modified with an unsaturated carboxylic acid in combination with a fluororubber in the base rubber, abrasion resistance, outer appearance, and the like of the thus-formed heat-resistant crosslinked fluororubber formed body can be improved.

The ethylene-based copolymer resin modified with an unsaturated carboxylic acid component (hereinafter, may be also referred to as an unsaturated carboxylic acid-modified ethylene-based copolymer resin) is not particularly limited, and examples thereof include resins produced by modifying an ethylene-based copolymer resin with an unsaturated carboxylic acid component.

The unsaturated carboxylic acid-modified ethylene-based copolymer resin preferably has a site (carbon atom having a hydrogen atom) capable of grafting reaction in the main chain or at the end thereof.

The modification rate by an unsaturated carboxylic acid in the unsaturated carboxylic acid-modified ethylene-based copolymer resin is preferably 0.5 to 15% by mass with respect to the ethylene-based copolymer resin.

The ethylene-based copolymer resin to be used in the unsaturated carboxylic acid-modified ethylene-based copolymer resin is not particularly limited, and examples thereof include ethylene/α-olefin copolymers and polyolefin copolymers having an acid-copolymerization component or an acid ester-copolymerization component. Specifically, examples thereof include ethylene/vinyl acetate copolymer, ethylene/(meth)acrylic acid ester copolymer {for example, ethylene/ethyl (meth)acrylate ester copolymer, ethylene/ methyl (meth)acrylate ester copolymer, and ethylene/butyl (meth)acrylate ester copolymer}, and ethylene/(meth) acrylic acid copolymer resin. These copolymers may be used singly alone, or in combination of two or more kinds thereof. In the present invention, as the ethylene-based copolymer resin, the use of ethylene/vinyl acetate copolymer or the like is preferred from the viewpoint of heat resistance.

Further, as the above-described unsaturated carboxylic acid, for example, use can be made of acrylic acid, methacrylic acid, maleic acid, itaconic acid, fumaric acid, maleic acid anhydride, itaconic acid anhydride, and fumaric acid anhydride. These unsaturated carboxylic acids may be used singly alone, or in combination of two or more kinds thereof.

The unsaturated carboxylic acid-modified ethylene-based copolymer resin may be appropriately synthesized, or commercially available products thereof may be used. In a case of synthesizing the unsaturated carboxylic acid-modified ethylene-based copolymer resin, usually, this copolymer resin can be obtained by heating and kneading an ethylene-based copolymer resin and an unsaturated carboxylic acid in the presence of an organic peroxide, to thereby modify the ethylene-based copolymer resin.

The unsaturated carboxylic acid-modified ethylene-based copolymer resin may be used singly alone, or in combination of two or more kinds thereof.

Further, examples of the commercially available products as the unsaturated carboxylic acid-modified ethylene-based copolymer resin include OREVAC (trade name, manufactured by ARKEMA Co., Ltd.), LOTADER (trade name, manufactured by ARKEMA Co., Ltd.), and FUSABOND (trade name, manufactured by DuPont).

Among the above-described unsaturated carboxylic acid-modified ethylene-based copolymer resins, ethylene/vinyl acetate copolymer (EVA) resin modified with an unsaturated carboxylic acid, ethylene/ethyl (meth)acrylate copolymer resin modified with an unsaturated carboxylic acid, ethylene/methyl (meth)acrylate copolymer resin modified with an unsaturated carboxylic acid, or a combination thereof is preferred from the viewpoints of heat resistance and outer appearance, and ethylene/vinyl acetate copolymer resin modified with an unsaturated carboxylic acid is more preferred from the viewpoint of abrasion resistance.

The content of the unsaturated carboxylic acid-modified ethylene-based copolymer resin is 1 to 40% by mass, preferably 3 to 40% by mass, and more preferably 10 to 25% by mass, with respect to 100% by mass of the base rubber. If the content thereof is 1 to 40% by mass, a formed body exhibiting excellent abrasion resistance can be obtained by combining with a fluororubber. Further, by this content, a formed body exhibiting excellent flexibility can be made in some cases.

The base rubber preferably contains 60 to 97% by mass of a fluororubber and 3 to 40% by mass of an unsaturated carboxylic acid-modified ethylene-based copolymer resin.

In the present invention, the base rubber may contain, in addition to the fluororubber and the unsaturated carboxylic acid-modified ethylene-based copolymer resin, other resins or rubbers, oil components (for example, mineral oils, such as paraffin oil and the like) and the like.

In this case, the content rate of each component of the base rubber is appropriately determined so that a total of said each component is 100% by mass.

As the other resins or rubbers, those having a site capable of grafting reaction in a main chain or at the end thereof are preferred. For example, ethylene/vinyl acetate copolymer resin, ethylene/(meth)acrylic acid ester copolymer resin, and ethylene/(meth)acrylic acid copolymer resin (those modified with an unsaturated carboxylic acid are excluded from each of these resins), or acrylic rubbers, or a combination thereof are preferred. These resins or rubbers may be used singly alone or in combination of two or more kinds thereof.

In the production method of the present invention, by mixing with these resins or rubbers, more excellent abrasion resistance can be given to the resultant formed body. It is considered that this is because these resins or rubbers and other base rubber components are dynamically crosslinked with each other in melt-kneading (in the progress of a silane grafting reaction) and/or in a formation, to thereby reinforce a silane cross-liking structure. As these other resins or rubbers, more preferred are ethylene/vinyl acetate copolymer resin, ethylene/methyl acrylate copolymer resin, ethylene/ethyl acrylate copolymer resin, and ethylene/butyl acrylate copolymer resin, or acrylic rubbers, and ethylene/vinyl acetate copolymer resin is further more preferred.

Each of these resins or rubbers is not particularly limited and synthetic compounds or commercially available products may be appropriately used.

The content rate of these resins or rubbers in the base rubber preferably 0 to 20% by mass, more preferably 0 to 15% by mass, furthermore preferably 3 to 15% by mass, and most preferably 5 to 13% by mass. If the above-described content is within the above-described ranges, these resins or rubbers exhibit more excellent abrasion resistance and extrusion formability.

Further, as the above-described other resins, fluororesins (those which do not correspond to the above-described fluororubber) may be also preferably used. The present invention can be classified into 2 classes consisting of one aspect in which the base rubber does not contain a fluororesin, and another aspect in which the base rubber contains a fluororesin. By mixing with the fluororesin, excellent mechanical strength and abrasion resistance can be given to the heat-resistant crosslinked fluororubber formed body.

Specific examples of the fluororesin include a resin of a homopolymer or a copolymer, containing a fluorine atom in a main chain or a side chain. The fluororesin can be ordinarily obtained by polymerizing (copolymerizing) a monomer containing the fluorine atom.

Such a fluororesin is not particularly limited, and specific examples thereof include a resin of a copolymer between fluorine-containing monomers, such as perfluorohydrocarbon including tetrafluoroethylene and hexafluoropropylene, and partially fluorinated hydrocarbon (e.g. vinylidene fluoride), and a resin of a copolymer between such a fluorine-containing monomer and hydrocarbon, such as ethylene and/or propylene.

Specific examples thereof include a tetrafluoroethylene/hexafluoropropylene copolymer resin, a tetrafluoroethylene/perfluoroalkyl ether copolymer resin, an ethylene/tetrafluoroethylene copolymer resin, an ethylene/tetrafluoroethylene/hexafluoropropylene copolymer resin, a chlorotrifluoroethylene resin, and a polyvinylidene fluoride resin. Above all, an ethylene/tetrafluoroethylene/hexafluoropropylene copolymer resin, an ethylene/tetrafluoroethylene copolymer resin or a polyvinylidene fluoride resin, or any combination thereof is preferable.

A melting point of the fluororesin is preferably 250° C. or lower, and more preferably 200° C. or lower. If the melting point is excessively high, a compound or a formed body is foamed in kneading or extruding in several cases. The melting point can be measured based on ASTM D3159.

A percentage content of the fluororesin is not particularly limited as long as the percentage content is within the range of the percentage content of any other resin or rubber as described above, and the percentage content is preferably 0 to 20% by mass, and more preferably 3 to 15% by mass, in 100% by mass of the base rubber. If the percentage content of the fluororesin is 3 to 15% by mass, mechanical strength can be significantly improved.

<Organic Peroxide>

The organic peroxide generates radicals at least by thermal decomposition, and functions as a catalyst, to cause a grafting reaction by a radical reaction of the base rubber with a silane coupling agent (a covalent bond-forming reaction between a grafting reaction site of the silane coupling agent and a site capable of the grafting reaction of the base rubber, and this is also referred to as a (radical) addition reaction).

As the organic peroxide, those that have the above-described functions and are used for a radical polymerization or a conventional silane crosslinking method can be used without any particular limitation. For example, benzoyl peroxide, dicumyl peroxide (DCP), 2,5-dimethyl-2,5-di-(tert-butylperoxy)hexane or 2,5-dimethyl-2,5-di-(tert-butylperoxy)hexine-3 is preferred.

The decomposition temperature of the organic peroxide is preferably 80 to 195° C., and more preferably 125 to 180° C. For the present invention, the decomposition temperature of the organic peroxide means the temperature, at which, when an organic peroxide having a single composition is heated, the organic peroxide itself causes a decomposition reaction and decomposes into two or more kinds of compounds at a certain temperature or temperature range. In specific, the decomposition temperature is a temperature at which heat absorption or heat generation starts, when the organic peroxide is heated from a room temperature in a heating speed of 5° C./min under a nitrogen gas atmosphere, by a thermal analysis, such as a DSC method.

The organic peroxide may be used singly alone, or in combination of two or more kinds thereof.

<Inorganic Filler>

In the present invention, the inorganic filler is not particularly limited. However, preferred are those having, on their surfaces, a site that can be chemically bonded by a hydrogen bond or a covalent bond and the like, or an intermolecular bond with a reaction site (hydrolysable silyl group), such as a silanol group of the silane coupling agent. For the inorganic filler, examples of the site that can be chemically bonded with the reaction site of the silane coupling agent may include an OH group (OH group of hydroxy group, of water molecule in hydrous substance or crystallized water, or of carboxyl group), amino group, a SH group, and the like.

As such an inorganic filler, though not limited to these, use can be made of metal hydrate, such as a metal compound having a hydroxy group or crystallized water, for example, aluminum hydroxide, magnesium hydroxide, calcium carbonate, magnesium carbonate, calcium silicate, magnesium silicate, calcium oxide, magnesium oxide, aluminum oxide, aluminum nitride, aluminum borate whisker, hydrated aluminum silicate, hydrated magnesium silicate, basic magnesium carbonate, hydrotalcite, and talc. Further, use can be made of boron nitride, silica (crystalline silica, amorphous silica, and the like), carbon, clay (calcined clay), zinc oxide, tin oxide, titanium oxide, molybdenum oxide, antimony trioxide, a silicone compound, quartz, zinc borate, white carbon, zinc borate, zinc hydroxystannate, or zinc stannate.

As the inorganic filler, a surface-treated inorganic filler, surface-treated with a silane coupling agent or the like can be used. Specific examples of silane-coupling-agent-surface-treated inorganic filler include KISUMA 5L and KISUMA 5P (both trade names, magnesium hydroxide, manufactured by Kyowa Chemical Industry Co., Ltd.) or the like. The amount of surface treatment of the inorganic filler with a silane coupling agent is not particularly limited, but is 3 mass % or less, for example.

Among these inorganic fillers, preferred is silica, calcium carbonate, zinc oxide, a calcined clay or talc, or a combination thereof. Silica, calcium carbonate, zinc oxide, a calcined clay, or a combination thereof is more preferred. A combination including silica or zinc oxide is furthermore preferred. From the viewpoint of abrasion resistance, silica is preferred.

The inorganic filler may be used singly alone, or in combination of two or more kinds thereof.

When the inorganic fillers is in a powder form, the inorganic filler has an average particle diameter of preferably 0.2 to 10 μm, more preferably 0.3 to 8 μm, further preferably 0.4 to 5 μm, and particularly preferably 0.4 to 3 μm. If the average particle diameter is within the above-described range, a silane coupling agent holding effect is high, to provide the product having excellent heat resistance. In addition, the inorganic filler is hard to cause secondary aggregation in mixing with the silane coupling agent, to provide the product having excellent outer appearance. The average particle diameter is obtained by dispersing the inorganic filler in alcohol or water, and then measuring using an optical particle diameter measuring device, such as a laser diffraction/scattering particle diameter distribution measuring device.

<Silane Coupling Agent>

The silane coupling agent is not particularly limited, as long as it has a site (a group or an atom, this site is also referred to as a grafting reaction site) capable of causing a grafting reaction with a site of the base rubber that is capable of causing a grafting reaction, and further has a hydrolysable silyl group capable of causing silanol condensation. Examples of these silane coupling agents include silane coupling agents which have been used in the conventional silane crosslinking method.

Examples of these silane coupling agents include silane coupling agents having an unsaturated group. Specific examples thereof include: vinyl silanes, such as vinyl trimethoxy silane, vinyl triethoxy silane, vinyl tributoxy silane, vinyl dimethoxy silane, vinyl dimethoxybutoxy silane, vinyl diethoxybutoxy silane, allyl trimethoxyethoxy silane, allyl triethoxy silane and vinyl triacetoxy silane; and (meth)acryloxy silane. Of all others, vinyl trimethoxy silane or vinyl triethoxy silane is particularly preferred.

The silane coupling agent may be used singly alone, or in combination of 2 or more kinds thereof.

The silane coupling agent may be used directly (without any change of the form), or in the form of being diluted with a solvent.

<Silanol Condensation Catalyst>

The silanol condensation catalyst is capable of causing a condensation reaction (acceleration), in the presence of moisture, of a hydrolysable silyl group of the silane coupling agent grafted to the base rubber. Due to the function of this silanol condensation catalyst, base rubbers are mutually crosslinked through the silane coupling agent. As a result, a heat-resistant crosslinked fluororubber formed body having excellent heat resistance is obtained.

The forgoing silanol condensation catalyst is not particularly limited. Examples thereof include organic tin compounds, metal soaps, and platinum compounds. As the organic tin compounds, examples thereof include organic tin compounds, such as dibutyl tin dilaurate, dioctyl tin dilaurate, dibutyl tin dioctylate, and dibutyl tin diacetate.

The silanol condensation catalyst may be used singly alone, or in combination of 2 or more kinds thereof.

<Carrier Rubber>

The silanol condensation catalyst may be mixed with the rubber, if desired, and used. In addition, the silanol condensation catalyst and the rubber can also be separately blended. In this case, preferable is rubber (also referred to as 'carrier rubber') to be mixed or blended is not particularly limited, and the base rubber component to be used in the silane masterbatch. When such the materials are separately blended, the carrier rubber is preferably blended in mixing the silane masterbatch and the silanol condensation catalyst at the time of extrusion.

<Additive>

To the heat-resistant crosslinked fluororubber formed body and the like, at least one of various additives, which are usually used for electric wires, electric cables, electric cords, sheets, foams, tubes, and pipes, may be properly used in the range that does not adversely affect the effects exhibited by the present invention. Examples of these additives include a crosslinking assistant, an antioxidant, a lubricant, a metal inactivator, a filling agent (including a flame retardant and a flame retardant aid), and the like.

The antioxidant is not particularly limited, but, for example, an amine-based antioxidant, a phenol-based antioxidant, a sulfur-based antioxidant, and the like, can be used. Examples of the amine-based antioxidant include 4,4'-dioctyl-diphenylamine, N,N'-diphenyl-p-phenylenediamine, 2,2,4-trimethyl-1,2-dihydroquinoline polymer; and the like. Examples of the phenol-based antioxidant include pentaerythritol-tetrakis(3-(3,5-di-tert-butyl-4-hydroxyphenyl) propionate), octadecyl-3-(3,5-di-tert-butyl-4-hydroxyphenyl)propionate, 1,3,5-trimethyl-2,4,6-tris(3,5-di-tert-butyl-4-hydroxybenzyl)benzene; and the like. Examples of the sulfur-based antioxidant include bis(2-methyl-4-(3-n-alkyl-thiopropionyloxy)-5-tert-butylphenyl)sulfide, 2-mercaptobenzimidazole and zinc salts thereof, and pentaerythritol-tetrakis(3-lauryl-thiopropionate). The antioxidant is preferably included in a content of 0.1 to 15.0 parts by mass, and more preferably included in a content of 0.1 to 10 parts by mass, with respect to 100 parts by mass of the base rubber.

<Method of Producing a Heat-Resistant Crosslinked Fluororubber Formed Body>

Next, the production method of the present invention is specifically described.

The method of producing a heat-resistant crosslinked fluororubber formed body according to the present invention includes the following steps (1), (2) and (3).

The silane masterbatch of the present invention is produced by the following step (a), the masterbatch mixture of the present invention is produced by mixing the silane masterbatch produced by the following step (a) with a silanol condensation catalyst or a catalyst masterbatch, for example, by a pre-mixing (dry blend described below) in the following step (c)

<Step (1)>

A step of obtaining a reaction composition containing a silane crosslinkable rubber by melt-mixing, with respect to 100 parts by mass of a base rubber containing 60 to 99% by mass of a fluororubber and 1 to 40% by mass of an ethylene-based copolymer resin modified with an unsaturated carboxylic acid, 0.003 to 0.5 parts by mass of an organic peroxide, 0.5 to 400 parts by mass of an inorganic filler, 2 to 15 parts by mass of a silane coupling agent having a grafting reaction site that is capable of being subjected to a grafting reaction with said base rubber in the presence of radicals generated from said organic peroxide, and a silanol condensation catalyst.

<Step (2)>

A step of obtaining a formed body by forming the reaction composition.

<Step (3)>

A step of obtaining the heat-resistant crosslinked fluororubber formed body by bringing the formed body into contact with water.

Herein, when the step (1) is performed, in a case of melt-mixing all of the base rubber in the following step (a), the step (1) includes the following step (a) and step (c), or in a case of melt-mixing a part of the base rubber in the following step (a), the step (1) includes the following step (a), step (b) and step (c), and the ethylene-based copolymer resin modified with an unsaturated carboxylic acid is melt-mixed in at least one of the following steps (a) and (b).

<Step (a)>

A step of preparing a silane masterbatch containing a silane crosslinkable rubber, by melt-mixing all or part of the base rubber, the organic peroxide, the inorganic filler and the silane coupling agent at a temperature equal to or higher than a decomposition temperature of said organic peroxide, and by graft-reacting the grafting reaction site and the base rubber due to radicals generated from said organic peroxide.

<Step (b)>

A step of preparing a catalyst masterbatch, by melt-mixing a remainder of the base rubber, and the silanol condensation catalyst.

<Step (c)>

A step of obtaining the reaction composition, by melt-mixing the silane masterbatch and the silanol condensation catalyst or the catalyst masterbatch.

In the method of producing a heat-resistant crosslinked fluororubber formed body according to the present invention, an ethylene-based copolymer resin modified with an unsaturated carboxylic acid is melt-mixed at least in one of the above-described step (a) and the above-described step (b). The unsaturated carboxylic acid-modified ethylene-based copolymer resin is melt-mixed preferably at least in the step (a). More preferably, the unsaturated carboxylic acid-modified ethylene-based copolymer resin is melt-mixed in the step (a). By using the unsaturated carboxylic acid-modified ethylene-based copolymer resin in combination with a fluororubber in the method of the present invention, miscibility of a silane masterbatch with a catalyst masterbatch is enhanced, so that advanced abrasion resistance is achieved even by a formed body and a heat-resistant crosslinked fluororubber formed body having excellent heat resistance can be produced. Further, a heat-resistant crosslinked fluororubber formed body having excellent outer appearance can be produced in some cases.

In the production method of the present invention, the term "base rubber" is a resin for preparing a heat-resistant crosslinked fluororubber formed body. Accordingly, in the production method of the present invention, 100 parts by mass of the base rubber is contained in a reaction composition obtained in the step (1). In a case where a part of the base rubber is contained in the step (a), 100 parts by mass of the base rubber that is a blending amount in the step (1) is a total amount of the base rubber to be melt-mixed in the step (a) and the step (b).

In the step (1), the content rate of each of a fluororubber and an unsaturated carboxylic acid-modified ethylene-based copolymer resin, etc. in the base rubber is as described above. That is, a total of the content rates of each component in the step (a) and the step (b) is within the above-described range.

In the step (1), a blending amount of the organic peroxide is 0.003 to 0.5 part by mass, preferably 0.005 to 0.5 part by mass, and more preferably 0.005 to 0.2 parts by mass, with respect to 100 parts by mass of the base rubber. The grafting reaction can be performed in a suitable range by adjusting the blending amount of the organic peroxide within this range. Thus, the silane masterbatch or the like that is excellent in extrudability without generating a gel-like aggregated substance (aggregate) can be obtained.

In the step (1), the blending amount of the inorganic filler is 0.5 to 400 parts by mass, and preferably 30 to 280 parts by mass, with respect to 100 parts by mass of the base rubber. If the blending amount of the inorganic filler is less than 0.5 parts by mass, a grafting reaction of the silane coupling agent may become inhomogeneous, whereby none of excellent heat resistance and outer appearance or abrasion resistance can be given to the heat-resistant crosslinked fluororubber formed body in some cases. On the other hand, if the blending amount of the inorganic filler exceeds 400 parts by mass, none of excellent heat resistance and outer appearance or abrasion resistance can be given to the heat-resistant crosslinked fluororubber formed body in some cases.

The blending amount of the silane coupling agent is 2 to 15 parts by mass, with respect to 100 parts by mass of the base rubber. If the blending amount of the silane coupling agent is less than 2 parts by mass, the crosslinking reaction does not progress sufficiently, and the excellent heat resistance or abrasion resistance is not exhibited in several cases. In addition, in forming together with the silanol condensation catalyst, poor outer appearance or the aggregated substance is generated, and when an extruder is stopped, a large number of aggregated substances (foreign matters) are generated, in several cases. On the other hand, if the blending amount is over 15 parts by mass, the silane coupling agent is unable to be farther adsorbed on the inorganic filler surfaces, and the silane coupling agent is volatilized in kneading, and such a case is not economical. In addition, the silane coupling agent that is not adsorbed causes condensation, and a crosslinked gel or aggregated substance or a burn is generated in the formed body, and the outer appearance is liable to be deteriorated (poor).

From the above-described viewpoints, the blending amount of the silane coupling agent is preferably 3 to 12 parts by mass, and more preferably 4 to 12 parts by mass, with respect to 100 parts by mass of the base rubber.

In the step (1), the blending amount of the silanol condensation catalyst is not particularly limited, and is preferably 0.0001 to 0.5 part by mass, and more preferably 0.001 to 0.2 part by mass, with respect to 100 parts by mass of the base rubber. If the blending amount of the silanol condensation catalyst is within the above-mentioned range, the crosslinking reaction by the condensation reaction of the silane coupling agent easily progresses substantially uniformly, and the heat resistance, the outer appearance and the physical properties of the heat-resistant crosslinked fluororubber formed body are excellent, and productivity thereof is also improved.

The silane masterbatch can be prepared by casting all or part of the base rubber, the organic peroxide, the inorganic filler, and the silane coupling agent to a mixer in the above-described blending amount, and then by causing the above-described grafting reaction according to the step (a)

of melt-mixing them while heating at a temperature equal to or higher than a decomposition temperature of the organic peroxide.

The mixing order in the step (a) is not particularly limited and the above-described components may be mixed in any order.

The step (a) includes "an aspect in which all (100 parts by mass) of the base rubber is blended" and "an aspect in which a part of the base rubber is blended". In a case where a part of the base rubber is blended in the step (a), a remainder of the base rubber is preferably blended in the step (b).

Herein, in a case where a part of the base rubber is blended in the step (a), the base rubber is blended preferably in the proportion of 80 to 99% by mass, more preferably 85 to 95% by mass of the total in the step (a), and preferably 1 to 20% by mass, more preferably 5 to 15% by mass of the total in the step (b).

In the case where a part of the base rubber is blended in the step (a), the base rubber in the step (1) is blended preferably in the following manner in the step (a) and the step (b).

Herein, the content rate of the fluororubber in 100% by mass of the base rubber in the step (1) is designated as X, and the content rate of the unsaturated carboxylic acid-modified ethylene-based copolymer resin is designated as Y. X and Y satisfy the following relationship: X+Y 100% by mass. Further, of the content rate X of the fluororubber in the step (1), when the content rate of the fluororubber in the step (a) is designated as Xa, and when the content rate of the fluororubber in the step (b) is designated as Xb; X, Xa and Xb satisfy the following relationship: X=Xa+Xb. Of the content rate Y of the unsaturated carboxylic acid-modified ethylene-based copolymer resin in the step (1), when the content rate of the unsaturated carboxylic acid-modified ethylene-based copolymer resin in the step (a) is designated as Ya, and when the content rate of the unsaturated carboxylic acid-modified ethylene-based copolymer resin in the step (b) is designated as Yb; Y, Ya and Yb satisfy the following relationship: Y=Ya+Yb.

The content rate Xa of the fluororubber in the step (a) is preferably 50 to 89% by mass and more preferably 60 to 87% by mass. Further, the content rate Ya of the unsaturated carboxylic acid-modified ethylene-based copolymer resin in the step (a) is preferably 1 to 40% by mass and more preferably 3 to 25% by mass.

In the step (a), a ratio (Xa/Ya) of the content rate Xa of the fluororubber to the content rate Ya of the unsaturated carboxylic acid-modified ethylene-based copolymer resin in the base rubber is preferably 1.2 to 89 and more preferably 2.4 to 29.

The content rate Xb of the fluororubber in the step (b) is preferably 0 to 20% by mass and more preferably 5 to 15% by mass. Further, the content rate Yb of the unsaturated carboxylic acid-modified ethylene-based copolymer resin in the step (b) is preferably 0 to 12% by mass and more preferably 0 to 10% by mass.

Further, in the step (b), a ratio (Xb/Yb) of the content rate Xb of the fluororubber to the content rate Yb of the unsaturated carboxylic acid-modified ethylene-based copolymer resin in the base rubber (the carrier rubber) is preferably 0 to 40 and more preferably 0 to 20.

In the present invention, the inorganic filler is preferably mixed in advance with the silane coupling agent to use. That is, in the present invention, each component described above is preferably (melt-)mixed through the following steps (a-1) and (a-2).

Step (a-1): a step of mixing at least the inorganic filler and the silane coupling agent, to prepare a mixture.

Step (a-2): a step of melt-mixing the mixture obtained in the step (a-1) and all or part of the base rubber at a temperature equal to or higher than a decomposition temperature of the above-described organic peroxide, and then graft-reacting the above-described grafting reaction site and the above-described base rubber by radicals generated from said organic peroxide, to thereby prepare a silane masterbatch containing a silane crosslinkable rubber.

In the above-described step (a-2), the present invention includes "an aspect in which a total amount (100 parts by mass) of the base rubber is blended" and "an aspect in which part of the base rubber is blended". When part of the base rubber is blended in the step (a-2), a remainder of the base rubber is preferably blended in the step (b).

Herein, the blending amount of the base rubber in the step (a-2) in a case where a remainder of the base rubber is blended in the step (b) is the same as in the above-described step (a).

In the present invention, as described above, the silane coupling agent is preferably pre-mixed or the like with the inorganic filler (step (a-1)).

The method of mixing the inorganic filler and the silane coupling agent is not particularly limited, and mixing methods, such as wet treatment and dry treatment, can be mentioned. In the mixing method, known methods and conditions may be appropriately set. In the present invention, however, preferred is a dry treatment in which a silane coupling agent is added and mixed under the heated or unheated condition in an inorganic filler, preferably in a dried inorganic filler.

The pre-mixed silane coupling agent exists in such a manner of surrounding the surface of the inorganic filler, and a part or a whole thereof is adsorbed or bonded on the inorganic filler. In this manner, it becomes possible to suppress the volatilization of the silane coupling agent in the subsequent melt-mixing. Further, it is also possible to prevent the condensation among the silane coupling agents that are not adsorbed or bonded on the inorganic fillers, which makes melt-blending difficult. Furthermore, a desired shape can be obtained upon extrusion forming.

Examples of the forgoing mixing method include preferably a method of mixing (dispersing) the inorganic filler and the silane coupling agent at a temperature lower than a decomposition temperature of the organic peroxide, preferably at room temperature (25° C.), for about several minutes to about several hours in a dry system or a wet system.

In the mixing at a temperature lower than a decomposition temperature of the organic peroxide, a base rubber may be present, as long as the above-described temperature lower than a decomposition temperature of the organic peroxide is maintained. In this case, it is preferable that after mixing a metal oxide and a silane coupling agent together with the base rubber at the above-described temperature (the step (a-1)), these mixtures are melt-mixed. That is, it is preferable that while suppressing a radical grafting reaction between the base rubber and the silane coupling agent, these mixtures (for example, a dry blended product) are prepared, and then the mixture obtained is further melt-mixed, to thereby cause the above-described grafting reaction.

A method of mixing the organic peroxide is not particularly limited, and the organic peroxide only needs to exist in melt-mixing the above-described mixture and the base rubber. The organic peroxide may be mixed, for example, simultaneously with the inorganic filler and the like, or may be mixed in any of stages of mixing the inorganic filer and the silane coupling agent, or may be mixed with a mixture of the inorganic filler and the silane coupling agent. For example, the organic peroxide may be mixed with the inorganic filler after the organic peroxide is mixed with the silane coupling agent, or may be mixed with the inorganic filler separately from the silane coupling agent. Only the silane coupling agent may be mixed with the inorganic filler, and then the organic peroxide may be mixed, depending on production conditions.

In addition, the organic peroxide may be a material mixed with any other component or a single body.

In the production method of the present invention, the obtained mixture, all or part of the base rubber, and the remaining component(s) that is not mixed in the step (a-1) are subsequently melt-kneaded in the presence of the organic peroxide while the mixture is heated to the temperature equal to or higher than the decomposition temperature of the organic peroxide (step (a-2)). This causes a grafting reaction of the silane coupling agent to the base rubber, whereby the silane masterbatch containing the above-described silane crosslinkable rubber can be prepared.

In the step (a-2), the temperature at which the above-described components are melt-mixed (also referred to as melt-kneaded or kneaded) is equal to or higher than the decomposition temperature of the organic peroxide, preferably a temperature of the decomposition temperature of the organic peroxide plus (25 to 110°) C. This decomposition temperature is preferably set after the base rubber components are melted. If the above-described mixing temperature is applied, the above-described components are melted, and the organic peroxide is decomposed and acts thereon, and a required silane grafting reaction sufficiently progresses in the step (a-2). Other conditions, for example, a mixing time can be appropriately set.

A mixing method is not particularly limited, as long as the mixing method is a method ordinarily applied for rubber, plastic or the like. A mixing device may be appropriately selected depending on, for example, the blending amount of the inorganic filler. As a kneading device, a single-screw extruder, a twin-screw extruder, a roll, a Banbury mixer, or any of various kneaders may be used. From the standpoint of the dispersibility of the base rubber components and the stability of the crosslinking reaction, an enclosed mixer, such as Banbury mixer or any of various kneaders, is preferable.

In addition, when the inorganic filler is blended exceeding 100 parts by mass with respect to 100 parts by mass of the base rubber, the kneading is preferably performed with an enclosed mixer, such as a continuous kneader, a pressured kneader, or a Banbury mixer.

A mixing method of the base rubber containing the fluororubber and the unsaturated carboxylic acid-modified ethylene-based copolymer resin is not particularly limited. For example, a base rubber prepared by pre-mixing may be used. Alternatively, each component, for example, the fluororubber, the unsaturated carboxylic acid-modified ethylene-based copolymer resin, other resins or rubbers, etc., oil components, and a plasticizer may be separately mixed.

The mixing method having the step (a-1) and the step (a-2) includes preferably a method in which, as mentioned above, after mixing (dispersing) the inorganic filler and the silane coupling agent at a temperature lower than a decomposition temperature of the organic peroxide in a dry system or a wet system (the step (a-1), the mixture obtained and a base rubber are melt-mixed in the presence of the organic peroxide (step (a-2)).

By the melt-mixing in the step (a) (preferably the step (a-2)), a grafting reaction site of the silane coupling agent and a site capable of the grafting reaction of the base rubber are subjected to grafting-reaction by radicals generated from the organic peroxide. As a result, a silane crosslinkable rubber or a silane crosslinkable resin (these are collectively referred to as a silane crosslinkable rubber or a silane graft polymer), in which the silane coupling agent is bonded to a rubber component or a resin component through a covalent bond, is synthesized, so that a silane masterbatch containing the forgoing silane crosslinkable rubber is prepared. In this grafting reaction, normally, one molecular silane coupling agent is added to one site capable of the grafting reaction. However, the present invention is not limited to this relationship.

The above-described melt-mixing is preferably performed by a mixer-type kneading machine, such as Banbury mixer or kneaders. This allows prevention of an excessive crosslinking reaction between base rubber components, which results in excellent outer appearance.

In the present invention, when each component described above is melt-mixed at one time (step (1)), melt-mixing conditions are not particularly limited, and the conditions in the step (a-2) can be adopted.

In this case, part or all of the silane coupling agent is adsorbed or bonded to the inorganic filler upon melt-mixing.

In the step (a), especially in the step (a-2), the above-mentioned each component is preferably kneaded without substantially mixing the silanol condensation catalyst. Thus, condensation reaction of the silane coupling agents can be suppressed, melt-mixing is easily conducted, and a desired shape can be obtained at the time of extrusion forming. Here, the term "without substantially mixing" does not meant to exclude the situation wherein the silanol condensation catalyst unavoidably exists, and means that the silanol condensation catalyst may exist at a degree at which the above-mentioned problem due to silanol condensation of the silane coupling agent is not caused. For example, in the step (a-2), the silanol condensation catalyst may exist when the content is 0.01 part by mass or less, with respect to 100 parts by mass of the base rubber.

In the step (1), in addition to the above-described components, it is also preferable for the base rubber to have, as a base rubber component, the above-described other resins or rubbers each of which has a site capable of a grafting reaction in the main chain or at the end thereof. In this step, the blending amount of the other resins or rubbers and the above-described any of additives that can be used is appropriately set to the extent that it does not damage the purpose of the present invention.

In the step (1), the above-described any of additives, particularly, the antioxidant or the metal inactivator may be mixed in any step or to any component, but may be mixed in the carrier rubber in view of not inhibiting the grafting reaction of the silane coupling agent mixed in the inorganic filler to the base rubber.

In the step (a), a fluororesin may be mixed with any of components in any of the steps. Depending on a melting point of the fluororesin, a kneading temperature in the step (a) must be high. However, at such high temperature, in some cases, the organic peroxide in the silane MB decomposes to inhibit a grafting reaction, or a silane coupling agent is volatilized. Therefore, the fluororesin is preferably mixed in a step (b), from the viewpoint of suppressing the decomposition of the organic peroxide, and from the viewpoint of suppressing volatilization of the silane coupling agent.

When part of a base rubber is blended in the step (a-2), the fluororesin may be blended as part of the base rubber to be used in the step (a-2) or as the remainder of the base rubber to be used in the step (b).

In this way, in performance of the step (a) {preferably the step (a) consisting of the step (a-1) and the step (a-2)}, the silane coupling agent and the base rubber are subjected to a grafting reaction, to thereby prepare a silane masterbatch (also referred to as a silane MB). That is, a silane masterbatch to be used for production of a masterbatch mixture is prepared. Further, the silane MB is used for the production of the reaction composition (the silane crosslinkable rubber composition) prepared in the step (1) as described below, preferably together with a catalyst masterbatch as described below. This silane MB contains a silane crosslinkable rubber in which a silane coupling agent has been grafted to a base rubber to the extent that it is capable of formation in the step (2) described below. That is, the silane MB is used for the production of a masterbatch mixture that is prepared by mixing the silane crosslinkable rubber grafted with 2 to 15 parts by mass of the silane coupling agent with respect to 100 parts by mass of the above-described base resin, 0.5 to 400 parts by mass of the inorganic filler with respect to 100 parts by mass of the base resin, and the silanol condensation catalyst, and the silane MB contains the silane crosslinkable rubber prepared by melt-mixing all or part of the base rubber, the organic peroxide, the inorganic filler and the silane coupling agent at a specific rate, to thereby subject the silane coupling agent and the base rubber to a grafting-reaction due to radicals generated from the organic peroxide.

In the production method of the present invention, next, in a case where a part of the base rubber is melt-mixed in the step (a), a step (b) of melt-mixing a remainder of the base rubber and the silanol condensation catalyst, to thereby prepare a catalyst masterbatch (also referred to as a catalyst MB) is performed. Accordingly, in a case where all of the base rubber is melt-mixed in the step (a), the step (b) may be skipped. Alternatively, other resins and the silanol condensation catalyst may be mixed.

A mixing rate of a remainder of the above-described base rubber as the carrier rubber and the silanol condensation catalyst is not particularly limited. However, the mixing rate is preferably set so that the above-described blending amount in the step (1) is satisfied.

In the mixing in the step (b), as described above, the unsaturated carboxylic acid-modified ethylene-based copolymer resin may be blended as a remainder component of the base rubber. The remainder of the base rubber in the step (b) includes an aspect of containing the fluororubber and the unsaturated carboxylic acid-modified ethylene-based copolymer resin and an aspect of containing the unsaturated carboxylic acid-modified ethylene-based copolymer resin without the fluororubber.

In the mixing in the step (b), as mentioned above, it is preferable to blend the fluororesin as a component of the remainder of the base rubber. In other words, it is preferable to contain the fluororesin in the remainder of the base rubber. The remainder of the base rubber in the step (b) includes an aspect of containing the fluororubber and the fluororesin, and an aspect of containing the fluororesin without fluororubber.

The mixing only needs to be performed by a method having a capability of uniformly performing mixing, and specific examples thereof include mixing (melt-mixing) performed under melting of the base rubber. The melt-mixing can be performed in a manner similar to the melt-mixing in the above-described step (a-2). For example, the mixing temperature is preferably from 80 to 250° C., and more preferably from 100 to 240° C. Other conditions, such as a mixing time, can be appropriately set.

The catalyst MB to be thus prepared is a mixture of the silanol condensation catalyst and the carrier rubber.

In the production method of the present invention, next, a step (c) of obtaining the reaction composition by melt-mixing the silane MB and the catalyst MB is performed. This reaction composition is a composition containing the silane crosslinkable rubber synthesized in the above-described step (a) {preferably step (a-2)}.

As the mixing method, any mixing method may be employed as long as the uniform reaction composition mixture can be obtained as mentioned above. For example, the mixing is basically similar to the melt-mixing in the step (a-2). There are resin components whose melting points cannot be measured by DSC or the like, elastomers for example, but kneading is performed at a temperature at which at least the base rubber melts. The melting temperature is appropriately selected according to the melting temperature of the base rubber or the carrier rubber, and it is preferably from 80 to 250° C., and more preferably from 100 to 240° C. Other conditions, for example, a mixing (kneading) time can be appropriately set.

In the step (b), in order to avoid the silanol condensation reaction, it is preferable that the silane MB and the silanol condensation catalyst are not kept in a high temperature state for a long period of time in the state of being mixed.

In the step (c), in order to avoid the silanol condensation reaction, it is preferable that the silane MB and the silanol condensation catalyst are not kept in a high temperature state for a long period of time in the state of being mixed.

In the step (c), the silane MB and the silanol condensation catalyst only need to be mixed, and the silane MB and the catalyst masterbatch are preferably melt-mixed.

In the present invention, the silane MB and the silanol condensation catalyst or catalyst MB can be dry-blended before both are melt-mixed. A method and conditions of dry blending are not particularly limited, and specific examples thereof include dry mixing and conditions in the step (a-1). The masterbatch mixture containing the silane MB and the silanol condensation catalyst is obtained by this dry blending.

In this way, the steps (a) to (c) {step (1)} are performed, so that the silane crosslinkable rubber composition can be produced as the reaction composition.

In the step (1), the steps (a) to (c) can be performed at the same time or in succession.

In the method of producing the silane crosslinkable rubber formed body of the present invention, next, a step (2) of obtaining the formed body by forming the reaction composition obtained is performed. This step (2) only needs to be capable of forming the reaction composition, and a forming method and forming conditions are appropriately selected according to a form of the heat-resistant product of the present invention. Specific examples of the forming method include extrusion forming using an extruder, extrusion forming using an injection forming machine, and forming using any other forming machine. The extrusion forming is preferable when the heat-resistant product of the present invention is the electric wire or the optical fiber cable.

The step (2) can be performed simultaneously with the step (c) or both steps can be continuously performed. That is, specific examples of one embodiment of the melt-mixing in the step (c) include an aspect of melt-mixing a forming raw material, in the melt-forming, for example, in the extrusion forming, or immediately before the extrusion forming. For example, pellets may be blended with each other at ordinary temperature or a high temperature, such as dry blend, and then placed (melt-mixed) in a forming machine, or the pellets may be blended, and then melt-mixed, re-pelletized, and then placed in a forming machine. More specifically, a series of steps can be employed in which a mixture of the silane MB and the silanol condensation catalyst or catalyst MB with the masterbatch mixture (forming-raw materials) is melt-kneaded in a coating device, and subsequently, extruded and coated on a periphery of a conductor or the like, and formed into a desired shape.

Thus, the formed body of the heat-resistant crosslinkable fluororubber composition is obtained, in which the silane masterbatch and the silanol condensation catalyst or catalyst MB are dry-blended, to prepare the masterbatch mixture, and the masterbatch mixture is introduced into the forming machine and formed.

Here, a melt mixture of the masterbatch mixture (the reaction composition) contains the silane crosslinkable rubber with different crosslinking methods. In this silane crosslinkable rubber, the reaction site (i.e. a hydrolysable silyl group) of the silane coupling agent may be bonded or adsorbed to the inorganic filler, but is not subjected to silanol condensation as described later. Accordingly, the silane crosslinkable rubber contains at least crosslinkable rubber in which the silane coupling agent bonded or adsorbed to the inorganic filler is grafted to the base rubber (i.e. the fluororubber and the mixture thereof), and the crosslinkable rubber in which the silane coupling agent not bonded or adsorbed to the inorganic filler is grafted to the base rubber. In addition, the silane crosslinkable rubber may have the silane coupling agent to which the inorganic filler is bonded or adsorbed, and the silane coupling agent to which the inorganic filler is not bonded or adsorbed. Further, the silane crosslinkable rubber may contain the base rubber component unreacted with the silane coupling agent.

When the silane crosslinkable rubber contains at least one kind selected from the group consisting of a resin of an ethylene/vinyl acetate copolymer, a resin of an ethylene/(meth)acrylate copolymer and a resin of an ethylene/(meth) acrylic acid copolymer, and an acrylic rubber, as the base rubber component, the silane crosslinkable rubber is dynamically crosslinked. Here, an expression "dynamically crosslinked" means causing partial crosslinking of at least one kind of the resin or the rubber described above, in a state of melt-mixing of the masterbatch mixture, in the presence of the organic peroxide (in mixing or kneading), or a state of being crosslinked. Flowability is reduced by this dynamic crosslinking (for example, Mooney viscosity is increased, or a melt flow rate (MFR) is decreased). This dynamic crosslinking is formed in mixing in the step (a) and/or the step (b) described above.

As described above, the silane crosslinkable rubber is an uncrosslinked body in which the silane coupling agent is not subjected to silanol condensation. Practically, if the melt-mixing is performed in the step (c), crosslinking of part (partial crosslinking) is inevitable, but at least formability in forming is to be kept on the heat-resistant crosslinkable fluororubber composition to be obtained.

In the formed body to be obtained through the step (2), partial crosslinking is inevitable in a manner similar to the above-described mixture, but the formed body is in a partially crosslinked state of keeping formability at which the composition can be formed in the step (2). Accordingly, this heat-resistant crosslinked fluororubber formed body of the present invention is obtained as the formed body crosslinked or finally crosslinked, by performing the step (3).

In the method of producing the heat-resistant crosslinked fluororubber formed body of the present invention, the step (3) of bringing the formed body obtained in the step (2) into contact with water is performed. Thus, the reaction site of the silane coupling agent is hydrolyzed into silanol, and hydroxyl groups of the silanol are subjected to condensation by the silanol condensation catalyst existing in the formed body, and the crosslinking reaction occurs. Thus, the heat-resistant crosslinked fluororubber formed body in which the silane coupling agent is subjected to silanol condensation and crosslinked can be obtained.

The treatment itself in this step (3) can be carried out according to an ordinary method. The condensation reaction between the silane coupling agents progresses just in storage at ordinary temperature. Accordingly, in the step (3), it is unnecessary to positively bring the formed body into contact with water. In order to accelerate this crosslinking reaction, the formed body can also be contacted positively with moisture. For example, the method of positively contacting the formed body with water can be employed, such as immersion into warm water, placement in a wet heat bath, and exposure to high temperature water vapor. In addition, pressure may be applied to in order to penetrate moisture thereinto on the above occasion.

Thus, the method of producing the heat-resistant crosslinked fluororubber formed body of the present invention is performed, and the heat-resistant crosslinked fluororubber formed body is produced. This heat-resistant crosslinked fluororubber formed body contains the silane-crosslinked product of the base rubber, that is, the crosslinked rubber or the crosslinked resin (this is collectively referred to as the crosslinked fluororubber) in which the (silane-crosslinkable) rubber or resin has been subjected to condensation through a silanol bond (a siloxane bond). As one form of this silane crosslinked fluororubber formed body, the formed body contains the silane crosslinked fluororubber and the inorganic filler. Here, the inorganic filler may be bonded to the silane coupling agent of the silane crosslinked fluororubber. Accordingly, the present invention includes an aspect in which the base rubber is crosslinked with the inorganic filler through the silanol bonding. Specifically, the silane crosslinked fluororubber contains at least the crosslinked fluororubber in which a plurality of base rubbers are bonded or adsorbed to the inorganic filler by the silane coupling agent and are bonded (crosslinked) through the inorganic filler and the silane coupling agent, and the crosslinked fluororubber in which the reaction sites of the above-described crosslinkable rubber with the silane coupling agent are hydrolyzed to cause the silanol condensation reaction with each other, whereby the crosslinkable rubber is crosslinked through the silane coupling agent. In addition, in the silane crosslinked fluororubber, the bonding (cross-link) through the inorganic filler and the silane coupling agent and the cross-link through the silane coupling agent may be mixed. Further, the silane crosslinked fluororubber may contain the rubber component unreacted with the silane coupling agent and/or an uncrosslinked silane crosslinkable rubber.

This crosslinked fluororubber may be further dynamically crosslinked in some cases, as mentioned above, with regard to the silane crosslinkable rubber.

Details of a reaction mechanism in the production method of the present invention are unknown yet, but it is considered as described below.

In general, if the organic peroxide is added to the base rubber, especially to the fluororubber, a radical is rapidly generated to facilitate occurrence of the crosslinking reaction between the base rubbers or the decomposition reaction thereof. Thus, the aggregated substance is generated in the obtained formed body and the physical properties thereof are reduced.

However, in the present invention, in the step (1), by making the inorganic filler coexist in decomposition reaction of the organic peroxide, the silane coupling agent is bonded to the inorganic filler through a silanol bond, a hydrogen bond, or an intermolecular bond. In particular, in the preferred embodiment of the step (1), the treatment for occurring the bonding, and the melt-mixing treatment are conducted separately. Thus, it is considered that a chance of causing the grafting reaction between the grafting reaction site of the silane coupling agent and the base rubber is increased. It is considered that a reaction of boding this kept silane coupling agent to the radical generated in the base rubber becomes dominant over the crosslinking reaction between the base rubbers or the decomposition reaction as described above. Accordingly, the grafting reaction (silane crosslinking) of the silane coupling agent to the base rubber can be made, and deterioration by the decomposition reaction of the base rubber, particularly, of the fluororubber, or the crosslinking reaction between the base rubbers in the reaction {the step (1)} is not caused. Therefore, it is considered that generation of the aggregated substance or reduction of the physical properties is hard to occur.

In a case where the step (a) includes the step (a-1) and the step (a-2), a higher level of heat resistance can be given to the heat-resistant crosslinked fluororubber formed body.

When these components are kneaded (melt-mixed) in the step (a-2), the silane coupling agent bonded or adsorbed to the inorganic filler by weak bonding (interaction by the hydrogen bonding, interaction between ions, partial charges or dipoles, action by adsorption, or the like) is detached from the inorganic filler, resulting in causing the grafting reaction with the base rubber. In the silane coupling agent thus graft-reacted, the reaction sites capable of silanol condensation are subjected to the condensation reaction (crosslinking reaction) to form the base rubber, especially fluororubber, crosslinked through the silanol condensation. The heat resistance of the heat-resistant crosslinked fluororubber formed body obtained through this crosslinking reaction is increased.

On the other hand, in the silane coupling agent bonded to the inorganic filler by strong bonding (chemical bonding with the hydroxyl group or the like on the surface of the inorganic filler, or the like), this condensation reaction by the silanol condensation catalyst in the presence of water is hard to occur, and bonding with the inorganic filler is kept. Therefore, bonding (crosslinking) of the base rubber with the inorganic filler through the silane coupling agent is formed. Thus, adhesion between the base rubber and the inorganic filler is consolidated, and the formed body that is excellent in mechanical strength and abrasion resistance and hard to be scratched is obtained. In particular, a plurality of silane coupling agents can be bonded to one inorganic filler particle surface, and high mechanical strength can be obtained.

It is presumed that by forming these silane crosslinkable rubber or silane graft polymer together with the silanol condensation catalyst, and then bringing it to contact with moisture, the crosslinked fluororubber formed body exhibiting high heat-resistance and abrasion resistance can be obtained.

In the present invention, the heat-resistant crosslinked fluororubber formed body having high heat resistance can be obtained by mixing the organic peroxide in a ratio of 0.003 part by mass or more, preferably 0.005 part by mass or more, and 0.5 part by mass or less, preferably 0.2 part by mass or less, and further by mixing the silane coupling agent in a ratio of 2 to 15 parts by mass, with respect to 100 parts by mass of the base rubber, in the presence of the inorganic filler.

In the production method of the present invention, by containing, in addition to the fluororubber, a specific amount of the unsaturated carboxylic acid-modified ethylene-based copolymer resin in the base rubber, the crosslinked fluororubber formed body that is excellent in abrasion resistance and outer appearance in addition to the above-described heat-resistance can be obtained. The reason is considered as follows.

The unsaturated carboxylic acid-modified ethylene-based copolymer resin contained in the base rubber bonds or adsorbs (chemically or physically interacts) to the inorganic filler through the carboxylic acid introduced by modification. Therefore, in the present invention, in addition to the above-described strong bonding of the silane coupling agent and the inorganic filler, a cross-link (bond) between the inorganic filler and the unsaturated carboxylic acid-modified ethylene-based copolymer resin is also formed. As a result, a degree of the adhesion between the inorganic filler and the base rubber components becomes higher. Further, dispersion properties of the inorganic filler can be increased by adding a specific blending amount of the unsaturated carboxylic acid-modified ethylene-based copolymer resin. It is considered that these result in excellent abrasion resistance. If there is too much unsaturated carboxylic acid-modified ethylene-based copolymer resin, its degree of adhesion to the inorganic filler becomes too high, which results in rather such situation that a desired abrasion resistance is not obtained in some cases. Further, since the heat resistance of the ethylene-based copolymer resin itself is made poor to the fluororubber, if there is much ethylene-based copolymer resin, heat resistance also lowers.

Furthermore, a miscibility of the fluororubber and the unsaturated carboxylic acid-modified ethylene-based copolymer resin is high. Therefore, it is considered that by containing these components in the base rubber, the viscosity of the heat-resistant crosslinkable fluororubber composition obtained by mixing the silane MB and the calalyst MB lowers, which results in good outer appearance.

The production method of the present invention can be applied to manufacture of a product that requires heat resistance (also including half-finished products, parts, and members), and further a product that requires mechanical strength, a product that requires flame retardancy, a component part or a member of the product, such as a rubber material and the like. Accordingly, the heat-resistant products of the present invention are identified as the forgoing products. Herein, the heat-resistant products may be a product containing the heat-resistant crosslinked fluororubber formed body, or may be a product consisting of only the heat-resistant crosslinked fluororubber formed body.

Examples of the heat-resistant products of the present invention include: electric wires, such as heat-resistant flame-retardant insulated wires and the like; coating materials for heat-resistant flame-retardant cables or optical fiber cables; rubber substitute wire or cable materials; as for the rest, heat-resistant parts for microwave or gas range; heat-resistant flame-retardant wire parts; flame-retardant heat-resistant sheets; and flame-retardant heat-resistant films. Further, examples thereof include: power plugs; connectors; sleeves; boxes; tubes; sheets; packings; cushion materials; vibration-proof materials; and wiring materials to be used for internal wiring or external wiring of electric or electronic pieces of equipment, in particular, electric wires or optical fiber cables.

Among the above described products, the production method of the present invention is particularly preferably applied to production of electric wire and optical fiber cable, and it can form a coating material (an insulator, a sheath) thereof.

When the heat-resistant product of the present invention is an extrusion formed article, such as the electric wire or the optical fiber cable, the product can be produced, preferably, while forming materials are melt-kneaded in the extruder (extrusion coating device) to prepare the heat-resistant crosslinkable fluororubber composition, by extruding this heat-resistant crosslinkable fluororubber composition on an outer periphery of a conductor or the like, to coat the conductor or the like. Such a heat-resistant product can be formed by extruding and coating the heat-resistant crosslinkable fluororubber composition, even if a large amount of inorganic fillers is added thereto, on a circumference of a conductor or a circumference of a conductor longitudinally lapped or twisted with tensile strength fibers, by using a general-purpose extrusion coating device, without using a special machine, such as an electron beam crosslinking machine. For example, as the conductor, a single wire, a stranded wire or the like of annealed copper can be used. Moreover, as the conductor, in addition to a bare wire, a tin-plated conductor or a conductor having an enamel-coating insulation layer can be used. A thickness of the insulation layer (coating layer formed of the heat resistant crosslinked fluororubber formed body of the present invention) formed around the conductor is not particularly limited, but is generally about 0.15 to 10 mm.

EXAMPLES

The present invention will be described in more detail based on examples given below, but the invention is not meant to be limited by these.

In Table 1, the numerical values for the content of the respective Examples and Comparative Examples are in terms of part by mass, unless otherwise specified.

Examples and Comparative Examples were produced via carring out by using the following components, and setting respective specifications to conditions shown in Table 1, and the results of evaluation as mentioned later are collectively shown in Table 1.

Details of each compound listed in Table 1 are described below.

A fluorine content of fluororubber is expressed in terms of a value according to the above-described "potassium carbonate pyrohydrolysis method".

<Base Rubber>
(Fluororubber)
"AFLAS 400E" (trade name, manufactured by AGC Asahi Glass Co., Ltd., tetrafluoroethylene/propylene copolymer rubber, fluorine content: 57% by mass)
"AFLAS 150P" (trade name, manufactured by AGC Asahi Glass Co., Ltd., tetrafluoroethylene/propylene copolymer rubber, fluorine content: 57% by mass)
"BITON GBL200" (trade name, manufactured by DuPont Elastomers Co., Ltd., hexafluoropropylene/vinylidene fluoride/tetrafluoroethylene copolymer rubber, fluorine content: 66% by mass) (Unsaturated carboxylic acid-modified ethylene-based copolymer resin)

"FUSABOND C250" (trade name, manufactured by DuPont, unsaturated carboxylic acid-modified ethylene/vinyl acetate copolymer (EVA) resin)
"BONDINE TX8030" (trade name, manufactured by ARKEMA Ltd., unsaturated carboxylic acid-modified ethylene/ethyl acrylate copolymer (EEA) resin)
"LOTADER 3410" (trade name, manufactured by ARKEMA Ltd., unsaturated carboxylic acid-modified ethylene/butyl acrylate copolymer (EBA) resin)
(Other Resins)
"VF120T" (trade name, manufactured by Ube Industries, Ltd., resin of ethylene/vinyl acetate copolymer, vinyl acetate content: 20% by mass)
"NUC 6510" (trade name, manufactured by Nippon Unicar Co., Ltd., ethylene/ethyl acrylate resin, EA content: 23% by mass, density: 0.93 g/cm$^3$)
"RP-4020" (trade name, manufactured by Daikin Industries, Ltd., resin of ethylene/tetrafluoroethylene/hexafluoropropylene (ethylene/FEP) copolymer, melting point: 160° C.)
"LH-8000" (trade name, manufactured by Asahi Glass Co., Ltd., resin of ethylene/tetrafluoroethylene (ETFE) copolymer, melting point: 180° C.)
"EP610" (trade name, manufactured by Daikin Industries, Ltd., resin of ethylene/tetrafluoroethylene (ETFE) copolymer, melting point: 210° C.)
<Organic Peroxide>
"PERHEXA 25B" (trade name, manufactured by NOF Corporation., 2,5-dimethyl-2,5-di(tert-butylperoxy)hexane, decomposition temperature 149° C.)
<Inorganic Filler>
"Zinc Oxide No. 1" (trade name, manufactured by Mitsui Mining & Smelting Co., Ltd., zinc oxide)
"SOFTON 1200" (trade name, manufactured by BIHOKU FUNKA KOGYO Co., Ltd., calcium carbonate)
"Aerosil 200" (trade name, manufactured by Nippon Aerosil Co., Ltd., hydrophilic fumed silica, amorphous silica)
"CRYSTALITE 5X" (trade name, manufactured by Tatsumori Ltd., crystalline silica)
"Satitone SP-33" (trade name, manufactured by Engelhard Corporation, calcined clay)
"MV Talc" (trade name, manufactured by Nihon Mistron Co., Ltd., talc)
<Silane Coupling Agent>
"KBM-1003" (trade name, manufactured by Shin-Etsu Chemical Co., Ltd., vinyltrimethoxysilane)
"KBE-1003" (trade name, manufactured by Shin-Etsu Chemical Co., Ltd., vinyltriethoxysilane)
<Silanol Condensation Catalyst>
"ADKSTAB OT-1" (trade name, manufactured by ADEKA Corporation, dioctyltin dilaurate)
<Antioxidizing Agent>
"IRGANOX 1010" (trade name, manufactured by BASF, pentaerythritol tetrakis[3-(3,5-di-tert-butyl-4-hydroxyphenyl)propionate])

Examples 1 to 26 and Comparative Examples 1 to 8

In Examples 1 to 26 and Comparative Examples 1 to 8, a part of the base rubber was used as a carrier rubber for the catalyst MB. In Examples 1 to 26, in either silane MB or catalyst MB, an unsaturated carboxylic acid-modified ethylene-based copolymer resin was used as a component of the base rubber (carrier rubber).

First, an inorganic filler and a silane coupling agent, in mass ratios listed in Table 1, were placed in a 10 L Henschel mixer manufactured by Toyo Seiki Seisaku-sho, Ltd. and the resultant mixture was mixed at room temperature (25° C.) for 1 hour to obtain a powder mixture (step (a-1)). Next, the power mixture thus obtained, and each component listed in the base rubber column and the organic peroxide in Table 1, in mass ratios listed in Table 1, were placed in a 2 L Banbury mixer manufactured by Nippon Roll MFG. Co., Ltd., and the resultant mixture was kneaded at a temperature equal to or higher than a decomposition temperature of the organic peroxide, specifically, at 190° C., for 10 minutes, and then discharged at a material discharge temperature of 200° C., to obtain a silane MB (step (a-2)). The silane MB obtained contains a silane crosslinkable rubber in which the silane coupling agent is graft-reacted onto the base rubber.

On the other hand, in Examples 1 to 24 and 26 and Comparative Examples 1 to 8, the catalyst MB was prepared as follows. A carrier rubber, a silanol condensation catalyst and an antioxidant were melt-mixed at a temperature of 180 to 190° C. in the mass ratio shown in Table 1 by a Banbury mixer, and the resultant melt-mixture was discharged therefrom at a material discharge temperature of 180 to 190° C., to obtain the catalyst MB (step (b)).

Further, in Example 25, since ethylene/tetrafluoroethylene having a melting point of 210° C. was used in a part of the carrier rubber, melt-mixing was performed at a temperature of 200 to 225° C. by a Banbury mixer, and the resultant melt-mixture was discharged therefrom at a material discharge temperature of 225° C., to obtain the catalyst MB.

These catalyst MB's each were the mixture of the carrier rubber and the silanol condensation catalyst.

Next, the silane MB and the catalyst MB were casted to (charged into) a closed ribbon blender and were subjected to dry-blending at room temperature (25° C.) for 5 minutes, to obtain a dry blended product (the masterbatch mixture).

Next, the dry blended product obtained was introduced to an extruder (compression zone screw temperature of 170° C., head temperature of 225° C.) equipped with a screw having specifications of L/D (a ratio of an effective length L and a diameter D of the screw)=24 and a screw diameter of 30 mm. While melt-mixing the dry blended product in this extruder (step (c)), the resultant melt-mixture was coated on the outside of the 1/0.8TA conductor so that the thickness thereof would be 1 mm, and extrusion-coating was performed at a linear velocity of 10 m/min so that the outside diameter thereof would be 2.8 mm, to obtain a coated conductor (step (2)). This coated conductor was left to stand for 1 week under the circumstance of temperature of 40° C. and humidity of 95% (step (3)).

In this way, an electric wire was produced, which had a coating layer composed of the heat-resistant crosslinked fluororubber formed body on the outer periphery of the above-described conductor. The heat-resistant crosslinked fluororubber formed body as a coating layer contained the above-described silane crosslinked fluororubber.

In Comparative Example 5, a lot of aggregated substances were generated and extrusion forming was not possible.

A heat-resistant crosslinkable fluororubber composition was prepared, by melt-mixing the above-described dry-blended product in the extruder before extrusion forming. This heat-resistant crosslinkable fluororubber composition is a melt mixture of the silane MB and the catalyst MB, and contains the above-mentioned silane crosslinkable rubber.

With respect to each electric wire produced, the following tests were conducted and results thereof were shown in Table 1.

<Heat Deformation Test>

The heat resistance of each electric wire produced was evaluated as follows.

With respect to each electric wire produced, according to the testing method prescribed by JIS C 3005, after preheating a wire sample at 180° C. for 30 min, a heat deformation test was conducted at the measuring temperature of 180° C. for 30 min at the load of 500 gf (4.9N). In this test, with respect to the heat deformation, a case where the heat deformation rate is 20% or less is expressed as "A (extremely excellent)", a case where the heat deformation rate is more than 20% but 30% or less is expressed as "B (excellent)", a case where the heat deformation rate is more than 30% but 50% or less is expressed as "C (good)", and these cases were evaluated as a pass revel. On the other, a wire sample with a deformation rate exceeding 50% was evaluated as "D (poor)".

<Hot Set Test>

The heat resistance of the electric wire produced was evaluated as follows.

A hot set test was conducted, by using a tubular piece prepared by extracting the conductor from each electric wire produced. In the hot set test, marker lines having a length of 50 mm were attached on the tubular piece, and then the tubular piece, to which a weight of $20N/cm^2$ was attached, was left to stand in a thermostat chamber for 15 minutes. By measuring a length after being left to stand, whether the elongation percentage (elongation (mm)/50 mm×100) is 100% or less was confirmed. A case where even if the temperature of the thermostat chamber to be used for the measurement was 250° C., the elongation percentage was 100% or less, was expressed as an extremely excellent product "A", and a case where if the temperature of the thermostat chamber was 250° C., the elongation percentage exceeded 100%, but if the temperature thereof was 200° C., the elongation percentage was 100% or less, was expressed as a good product "B". On the other hand, a case where if the temperature of the thermostat chamber was 200° C., the elongation percentage exceeded 100%, was expressed as "D" and was evaluated as poor.

<Abrasion Resistance Test>

Abrasion resistance of the electric wire produced was evaluated by the following abrasion resistance test (severe acceleration test).

Using each electric wire (sample) obtained in the above-described manner, the abrasion resistance test was conducted in conformity to EN50305. Placing the electric wire sample horizontally, a steel blade with 0.45 mmφ was reciprocated successively from above the electric wire while applying thereto a load of 10N, to abrade the coated layer. The blade was reciprocated successively until the blade arrived at the conductor of the sample. A portion which would be subjected to abrasion was abrased 4 times in total in a circumferential direction of 90°, 180°, 270° and 360°, and an average value of the number of round trips was calculated. A case where the average value was 500 times or more, was expressed as "A (an extremely high level product)", a case where the average value was 400 to 499 times, was expressed as "B (a high level product)", a case where the average value was 250 to 399 times, was expressed as "C (a good product)", a case where the average value was 100 to 249 times, was expressed as "D (an acceptable level)", and a case where the average value was 99 times or less, was expressed as "E (poor)".

<Extrusion Outer Appearance Test>

In the production of the above-described electric wire, an electric wire was produced, which had the coated layer composed of the heat-resistant crosslinked fluororubber formed body, in the same manner as the production of the above-described electric wire, except for changing a linear velocity at the time of extrusion coating, and an outer appearance of the coated layer of the electric wire obtained was observed to evaluate an extrusion outer appearance.

A product which was able to be formed into an electric wire that formed with a smooth surface without aggregated substances on the outer appearance of the coated layer even at a linear velocity of 50 m/min was expressed as "A (extremely excellent product)", a product which was able to be formed into an electric wire that formed with a smooth surface without aggregated substances on the outer appearance of the coated layer at a linear velocity of 30 m/min or more and less than 50 m/min was expressed as "B (excellent product)", a product which was able to be formed into an electric wire that formed with a smooth surface without aggregated substances on the outer appearance of the coated layer at a linear velocity of 10 m/min or more and less than 30 m/min was expressed as "C (good product)", and a product which was unable to be formed into an electric wire shape by remarkable occurrence of poor outer appearance even at a linear velocity of less than 10 m/min was expressed as "D (poor)". The extrusion outer appearance test is a reference test. However, the evaluation of "C" or greater, i.e. from C to A, is a pass level of this test.

<Heat Aging Test>

The heat resistance (long-term heat resistance) of the electric wire produced was evaluated as follows.

A tubular piece prepared by extracting the conductor from each electric wire was retained at a heating temperature of 236° C. for 168 hours. After that, tensile strength (MPa) of the tubular piece was measured under conditions of a gauge length of 20 mm and a tensile speed of 200 mm/min, based on JIS C 3005.

A retention rate (%) of the tensile strength was calculated by dividing the tensile strength after retention by the tensile strength before retention.

A product with a retention rate of the tensile strength of 80% or more was evaluated as being extremely excellent and expressed as "A". A product with a retention rate of the tensile strength of 70% or more and less than 80% was evaluated as being excellent and expressed as "B". A product with a retention rate of the tensile strength of 60% or more and less than 70% was evaluated as being good and expressed as "C". A product with a retention rate of the tensile strength of less than 60% was evaluated as being poor and expressed as "0".

TABLE 1

| | | | | Examples | | | | | | | | | |
|---|---|---|---|---|---|---|---|---|---|---|---|---|---|
| | | | | 1 | 2 | 3 | 4 | 5 | 6 | 7 | 8 | 9 | 10 |
| Si MB | base rubber | fluororubber | AFLAS 400E | 70 | 70 | 70 | 89 | 87 | 65 | 50 | 70 | 70 | 70 |
| | | fluororubber | AFLAS 150P | | | | | | | | | | |
| | | fluororubber | BITON GBL200 | | | | | | | | | | |
| | | EVA | VF 120T | 10 | 10 | 10 | | | | | 10 | 10 | 10 |
| | | EEA | NUC 6510 | | | | | | | | | | |
| | | modified-EVA | FUSABOND C250 | 10 | | | 1 | 3 | 25 | 40 | | | |
| | | modified-EEA | BONDINE TX8030 | | 10 | | | | | | | | |
| | | modified-EBA | LOTADER 3410 | | | 10 | | | | | | | |
| | organic peroxide | | PERHEXA 25B | 0.2 | 0.2 | 0.2 | 0.2 | 0.2 | 0.2 | 0.2 | 0.2 | 0.2 | 0.2 |
| | inorganic filler | zinc oxide | Zinc Oxide No. 1 | 5 | 5 | 5 | 5 | 5 | 5 | 5 | 5 | 5 | 5 |
| | | calcium carbonate | SOFTON 1200 | 50 | 50 | 50 | 50 | 50 | 50 | 50 | 50 | 50 | 50 |
| | | silica | Aerosil 200 | | | | | | | | | | |
| | | silica | CRYSTALITE 5X | | | | | | | | | | |
| | | calcined clay | Satitone SP-33 | | | | | | | | | | |
| | | talc | MV Talc | | | | | | | | | | |
| | Si-coupling agent | vinyl trimethoxy-silane | KBM-1003 | 5 | 5 | 5 | 5 | 5 | 5 | 5 | 5 | 5 | 5 |
| | | vinyl triethoxy-silane | KBE-1003 | | | | | | | | | | |
| cat. MB | carrier rubber | fluororubber | AFLAS 400E | 10 | 10 | 10 | 10 | 10 | 10 | 10 | 10 | 10 | 10 |
| | | ethylene/FEP copolymer | RP4020 (m.p. 160° C.) | | | | | | | | | | |
| | | ETFE resin | LH-8000 (m.p. 180° C.) | | | | | | | | | | |
| | | ETFE resin | EP610 (m.p. 210° C.) | | | | | | | | | | |
| | | modified-EVA | FUSABOND C250 | | | | | | | | 10 | | |
| | | modified-EEA | BONDINE TX8030 | | | | | | | | | 10 | |
| | | modified-EBA | LOTADER 3410 | | | | | | | | | | 10 |
| | Si—OH cond. cat. | dioctyltin dilaurate | ADKSTAB OT-1 | 0.05 | 0.05 | 0.05 | 0.05 | 0.05 | 0.05 | 0.05 | 0.05 | 0.05 | 0.05 |
| | antioxidant | | IRGANOX 1010 | 0.1 | 0.1 | 0.1 | 0.1 | 0.1 | 0.1 | 0.1 | 0.1 | 0.1 | 0.1 |
| Evaluation | | heat deformation test (%) | | A | B | B | B | B | A | A | B | B | B |
| | | hot set test | | A | A | A | A | A | A | A | A | A | A |
| | | abrasion resistance | | B | C | C | C | B | A | D | B | C | C |
| | | extr. outer appear. test | | A | A | A | B | A | A | B | A | A | A |
| | | heat aging test | | A | B | B | A | A | B | C | B | C | C |

TABLE 1-continued

|  |  |  |  | Examples |  |  |  |  |  |  |  |  |
|---|---|---|---|---|---|---|---|---|---|---|---|---|
|  |  |  |  | 11 | 12 | 13 | 14 | 15 | 16 | 17 | 18 | 19 |
| Si MB | base rubber | fluororubber | AFLAS 400E | 70 | 70 | 70 | 70 | 70 | 70 | 70 | 70 | 70 |
|  |  | fluororubber | AFLAS 150P |  |  |  |  |  |  |  |  |  |
|  |  | fluororubber | BITON GBL200 |  |  |  |  |  |  |  |  |  |
|  |  | EVA | VF 120T | 10 | 10 | 10 | 10 | 10 | 10 | 10 | 10 | 10 |
|  |  | EEA | NUC 6510 |  |  |  |  |  |  |  |  |  |
|  |  | modified-EVA | FUSABOND C250 | 10 | 10 | 10 | 10 | 10 | 10 | 10 | 10 | 10 |
|  |  | modified-EEA | BONDINE TX8030 |  |  |  |  |  |  |  |  |  |
|  |  | modified-EBA | LOTADER 3410 |  |  |  |  |  |  |  |  |  |
|  | organic peroxide |  | PERHEXA 25B | 0.2 | 0.2 | 0.2 | 0.2 | 0.003 | 0.5 | 0.2 | 0.2 | 0.2 |
|  | inorganic filler | zinc oxide | Zinc Oxide No. 1 |  | 5 | 5 | 5 | 5 | 5 | 5 | 5 | 5 |
|  |  | calcium carbonate | SOFTON 1200 |  | 395 | 50 | 50 | 50 | 50 |  |  |  |
|  |  | silica | Aerosil 200 | 0.5 |  |  |  |  |  |  |  |  |
|  |  | silica | CRYSTALITE 5X |  |  |  |  |  |  | 50 |  |  |
|  |  | calcined clay | Satitone SP-33 |  |  |  |  |  |  |  | 50 |  |
|  |  | talc | MV Talc |  |  |  |  |  |  |  |  | 50 |
|  | Si-coupling agent | vinyl trimethoxy-silane | KBM-1003 | 5 | 5 | 2 | 15 | 5 | 5 | 5 | 5 | 5 |
|  |  | vinyl triethoxy-silane | KBE-1003 |  |  |  |  |  |  |  |  |  |
| cat. MB | carrier rubber | fluororubber | AFLAS 400E | 10 | 10 | 10 | 10 | 10 | 10 | 10 | 10 | 10 |
|  |  | ethylene/FEP copolymer | RP4020 (m.p. 160° C.) |  |  |  |  |  |  |  |  |  |
|  |  | ETFE resin | LH-8000 (m.p. 180° C.) |  |  |  |  |  |  |  |  |  |
|  |  | ETFE resin | EP610 (m.p. 210° C.) |  |  |  |  |  |  |  |  |  |
|  |  | modified-EVA | FUSABOND C250 |  |  |  |  |  |  |  |  |  |
|  |  | modified-EEA | BONDINE TX8030 |  |  |  |  |  |  |  |  |  |
|  |  | modified-EBA | LOTADER 3410 |  |  |  |  |  |  |  |  |  |
|  | Si—OH cond. cat. | dioctyltin dilaurate | ADKSTAB OT-1 | 0.05 | 0.05 | 0.05 | 0.05 | 0.05 | 0.05 | 0.05 | 0.05 | 0.05 |
|  | antioxidant |  | IRGANOX 1010 | 0.1 | 0.1 | 0.1 | 0.1 | 0.1 | 0.1 | 0.1 | 0.1 | 0.1 |
| Evaluation |  | heat deformation test (%) |  | C | C | C | A | C | A | B | B | B |
|  |  | hot set test |  | B | B | A | A | B | A | A | A | A |
|  |  | abrasion resistance |  | C | C | C | A | C | B | A | B | B |
|  |  | extr. outer appear. test |  | B | B | A | B | A | B | A | A | A |
|  |  | heat aging test |  | B | C | B | A | C | B | A | A | A |

|  |  |  |  | Examples |  |  |  |
|---|---|---|---|---|---|---|---|
|  |  |  |  | 20 | 21 | 22 | 23 |
| Si MB | base rubber | fluororubber | AFLAS 400 E |  |  | 70 | 70 |
|  |  | fluororubber | AFLAS 150P | 70 |  |  |  |
|  |  | fluororubber | BITON GBL200 |  | 70 |  |  |
|  |  | EVA | VF 120T | 10 | 10 |  | 10 |
|  |  | EEA | NUC 6510 |  |  | 10 |  |
|  |  | modified-EVA | FUSABOND C250 | 10 | 10 | 10 | 10 |
|  |  | modified-EEA | BONDINE TX8030 |  |  |  |  |
|  |  | modified-EBA | LOTADER 3410 |  |  |  |  |
|  | organic peroxide |  | PERHEXA 25B | 0.2 | 0.2 | 0.2 | 0.2 |
|  | inorganic filler | zinc oxide | Zinc Oxide No. 1 | 5 | 5 | 5 | 5 |
|  |  | calcium carbonate | SOFTON 1200 | 50 | 50 | 50 | 50 |
|  |  | silica | Aerosil 200 |  |  |  |  |
|  |  | silica | CRYSTALITE 5X |  |  |  |  |
|  |  | calcined clay | Satitone SP-33 |  |  |  |  |
|  |  | talc | MV Talc |  |  |  |  |
|  | Si-coupling agent | vinyl trimethoxy-silane | KBM-1003 | 5 | 5 | 5 | 5 |
|  |  | vinyl triethoxy-silane | KBE-1003 |  |  |  |  |
| cat. MB | carrier rubber | fluororubber | AFLAS 400E | 10 | 10 | 10 |  |
|  |  | ethylene/FEP copolymer | RP4020 (m.p. 160° C.) |  |  |  | 10 |

TABLE 1-continued

|  |  |  |  |  |  |  |  |
|---|---|---|---|---|---|---|---|
|  |  | ETFE resin | LH-8000 (m.p. 180° C.) |  |  |  |  |
|  |  | ETFE resin | EP610 (m.p. 210° C.) |  |  |  |  |
|  |  | modified-EVA | FUSABOND C250 |  |  |  |  |
|  |  | modified-EEA | BONDINE TX8030 |  |  |  |  |
|  |  | modified-EBA | LOTADER 3410 |  |  |  |  |
|  | Si—OH cond. cat. | dioctyltin dilaurate | ADKSTAB OT-1 | 0.05 | 0.05 | 0.05 | 0.05 |
|  | antioxidant |  | IRGANOX 1010 | 0.1 | 0.1 | 0.1 | 0.1 |
| Evaluation |  | heat deformation test (%) |  | B | C | B | A |
|  |  | hot set test |  | A | B | A | A |
|  |  | abrasion resistance |  | B | C | C | A |
|  |  | extr. outer appear. test |  | A | B | A | A |
|  |  | heat aging test |  | A | B | B | A |

|  |  |  |  | Examples |  |  |
|---|---|---|---|---|---|---|
|  |  |  |  | 24 | 25 | 26 |
| Si MB | base rubber | fluororubber | AFLAS 400E | 70 | 70 | 70 |
|  |  | fluororubber | AFLAS 150P |  |  |  |
|  |  | fluororubber | BITON GBL200 |  |  |  |
|  |  | EVA | VF 120T | 10 | 10 | 10 |
|  |  | EEA | NUC 6510 |  |  |  |
|  |  | modified-EVA | FUSABOND C250 | 10 | 10 | 10 |
|  |  | modified-EEA | BONDINE TX8030 |  |  |  |
|  |  | modified-EBA | LOTADER 3410 |  |  |  |
|  | organic peroxide |  | PERHEXA 25B | 0.2 | 0.2 | 0.2 |
|  | inorganic filler | zinc oxide | Zinc Oxide No. 1 | 5 | 5 | 5 |
|  |  | calcium carbonate | SOFTON 1200 | 50 | 50 | 50 |
|  |  | silica | Aerosil 200 |  |  |  |
|  |  | silica | CRYSTALITE 5X |  |  |  |
|  |  | calcined clay | Satitone SP-33 |  |  |  |
|  |  | talc | MV Talc |  |  |  |
|  | Si-coupling agent | vinyl trimethoxy-silane | KBM-1003 | 5 | 5 |  |
|  |  | vinyl triethoxy-silane | KBE-1003 |  |  | 5 |
| cat. MB | carrier rubber | fluororubber | AFLAS 400E |  |  | 10 |
|  |  | ethylene/FEP copolymer | RP4020 (m.p. 160° C.) |  |  |  |
|  |  | ETFE resin | LH-8000 (m.p. 180° C.) | 10 |  |  |
|  |  | ETFE resin | EP610 (m.p. 210° C.) |  | 10 |  |
|  |  | modified-EVA | FUSABOND C250 |  |  |  |
|  |  | modified-EEA | BONDINE TX8030 |  |  |  |
|  |  | modified-EBA | LOTADER 3410 |  |  |  |
|  | Si—OH cond. cat. | dioctyltin dilaurate | ADKSTAB OT-1 | 0.05 | 0.05 | 0.05 |
|  | antioxidant |  | IRGANOX 1010 | 0.1 | 0.1 | 0.1 |
| Evaluation |  | heat deformation test (%) |  | A | A | C |
|  |  | hot set test |  | A | A | B |
|  |  | abrasion resistance |  | A | A | C |
|  |  | extr. outer appear. test |  | A | B | A |
|  |  | heat aging test |  | A | A | B |

|  |  |  |  | Comparative Examples |  |  |  |
|---|---|---|---|---|---|---|---|
|  |  |  |  | 1 | 2 | 3 | 4 |
| Si MB | base rubber | fluororubber | AFLAS 400E | 80 | 79 | 48 | 70 |
|  |  | fluororubber | AFLAS 150P |  |  |  |  |
|  |  | fluororubber | BITON GBL200 |  |  |  |  |
|  |  | EVA | VF 120T | 10 | 10.5 |  | 10 |
|  |  | EEA | NUC 6510 |  |  |  |  |

TABLE 1-continued

|  |  |  |  |  |  |  |  |
|---|---|---|---|---|---|---|---|
|  |  | modified-EVA | FUSABOND C250 |  | 0.5 | 42 | 10 |
|  |  | modified-EEA | BONDINE TX8030 |  |  |  |  |
|  |  | modified-EBA | LOTADER 3410 |  |  |  |  |
|  | organic peroxide |  | PERHEXA 25B | 0.2 | 0.2 | 0.2 | 0.001 |
|  | inorganic filler | zinc oxide | Zinc Oxide No. 1 | 5 | 5 | 5 | 5 |
|  |  | calcium carbonate | SOFTON 1200 | 50 | 50 | 50 | 50 |
|  |  | silica | Aerosil 200 |  |  |  |  |
|  |  | silica | CRYSTALITE 5X |  |  |  |  |
|  |  | calcined clay | Satitone SP-33 |  |  |  |  |
|  |  | talc | MV Talc |  |  |  |  |
|  | Si-coupling agent | vinyl trimethoxy-silane | KBM-1003 | 5 | 5 | 5 | 5 |
|  |  | vinyl triethoxy-silane | KBE-1003 |  |  |  |  |
| cat. MB | carrier rubber | fluororubber | AFLAS 400E | 10 | 10 | 10 | 10 |
|  |  | ethylene/FEP copolymer | RP4020 (m.p. 160° C.) |  |  |  |  |
|  |  | ETFE resin | LH-8000 (m.p. 180° C.) |  |  |  |  |
|  |  | ETFE resin | EP610 (m.p. 210° C.) |  |  |  |  |
|  |  | modified-EVA | FUSABOND C250 |  |  |  |  |
|  |  | modified-EEA | BONDINE TX8030 |  |  |  |  |
|  |  | modified-EBA | LOTADER 3410 |  |  |  |  |
|  | Si—OH cond. cat. | dioctyltin dilaurate | ADKSTAB OT-1 | 0.05 | 0.05 | 0.05 | 0.05 |
|  | antioxidant |  | IRGANOX 1010 | 0.1 | 0.1 | 0.1 | 0.1 |
| Evaluation |  | heat deformation test (%) |  | B | B | A | D |
|  |  | hot set test |  | B | B | A | D |
|  |  | abrasion resistance |  | E | E | E | D |
|  |  | extr. outer appear. test |  | C | C | C | A |
|  |  | heat aging test |  | A | A | D | D |

|  |  |  |  | Comparative Examples | | | |
|---|---|---|---|---|---|---|---|
|  |  |  |  | 5 | 6 | 7 | 8 |
| Si MB | base rubber | fluororubber | AFLAS 400E | 70 | 70 | 70 | 90 |
|  |  | fluororubber | AFLAS 150P |  |  |  |  |
|  |  | fluororubber | BITON GBL200 |  |  |  |  |
|  |  | EVA | VF 120T | 10 | 10 | 10 |  |
|  |  | EEA | NUC 6510 |  |  |  |  |
|  |  | modified-EVA | FUSABOND C250 | 10 | 10 | 10 |  |
|  |  | modified-EEA | BONDINE TX8030 |  |  |  |  |
|  |  | modified-EBA | LOTADER 3410 |  |  |  |  |
|  | organic peroxide |  | PERHEXA 25B | 0.6 | 0.2 | 0.2 | 0.2 |
|  | inorganic filler | zinc oxide | Zinc Oxide No. 1 | 5 | 0.2 | 5 | 5 |
|  |  | calcium carbonate | SOFTON 1200 | 50 |  | 450 | 50 |
|  |  | silica | Aerosil 200 |  |  |  |  |
|  |  | silica | CRYSTALITE 5X |  |  |  |  |
|  |  | calcined clay | Satitone SP-33 |  |  |  |  |
|  |  | talc | MV Talc |  |  |  |  |
|  | Si-coupling agent | vinyl trimethoxy-silane | KBM-1003 | 5 | 1 | 1 | 5 |
|  |  | vinyl triethoxy-silane | KBE-1003 |  |  |  |  |
| cat. MB | carrier rubber | fluororubber | AFLAS 400E | 10 | 10 | 10 | 10 |
|  |  | ethylene/FEP copolymer | RP4020 (m.p. 160° C.) |  |  |  |  |
|  |  | ETFE resin | LH-8000 (m.p. 180° C.) |  |  |  |  |
|  |  | ETFE resin | EP610 (m.p. 210° C.) |  |  |  |  |
|  |  | modified-EVA | FUSABOND C250 |  |  |  |  |
|  |  | modified-EEA | BONDINE TX8030 |  |  |  |  |
|  |  | modified-EBA | LOTADER 3410 |  |  |  |  |
|  | Si—OH cond. cat. | dioctyltin dilaurate | ADKSTAB OT-1 | 0.05 | 0.05 | 0.05 | 0.05 |
|  | antioxidant |  | IRGANOX 1010 | 0.1 | 0.1 | 0.1 | 0.1 |

TABLE 1-continued

| Evaluation | heat deformation test (%) | Can't be formed | D | D | B |
|---|---|---|---|---|---|
| | hot set test | | D | D | A |
| | abrasion resistance | | D | D | E |
| | extr. outer appear. test | | D | D | C |
| | heat aging test | | D | D | A |

(Note)
Si MB: silane masterbutch (MB)
cat. MB: catalyst masterbutch
Si-coupling agent: silane coupling agent
Si—OH cond. cat.: silanol condensation catalyst
m.p.: melting point
extr. outer appear. test: extrusion outer appearance test
(Note)
Can't be formed: It was impossible to be formed.

The results from Table 1 show the following matters.

Comparative Examples 1 to 8 were each poor in at least any of the heat deformation test, the hot set test, the heat aging test and abrasion resistance test.

Comparative Examples 1 and 8 in each of which neither the silane MB nor the catalyst MB contained any unsaturated carboxylic acid-modified ethylene-based copolymer resin, were each poor in the abrasion resistance test.

Comparative Examples 2 and 3 in each of which the content of the unsaturated carboxylic acid-modified ethylene-based copolymer resin was not within the range of 1 to 40% by mass of the base rubber, were each poor in the abrasion resistance test. Comparative Example 3 was also poor in the heat aging test.

Comparative Example 4 in which the blending amount of the organic peroxide was too small, was poor in any of the heat deformation test, the hot set test, and the heat aging test. It seems that cross-linking was insufficient.

Comparative Example 5 in which the blending amount of the organic peroxide was too much, was not able to produce any electric wire. Therefore, the above-described tests were not conducted. It seems that cross-linking progressed too much.

Comparative Examples 6 and 7 in each of which the blending amount of the inorganic filler was not within the range of 0.5 to 400 parts by mass with respect to 100 parts by mass of the base rubber and also the blending amount of the silane coupling agent was too small, was poor in any of the heat deformation test, the hot set test, and the heat aging test. Further, Comparative Examples 6 and 7 were also poor in the extrusion outer appearance test.

In contrast, Examples 1 to 26 each of which was produced according to the production method of the present invention, by blending the fluororubber and the unsaturated carboxylic acid-modified ethylene-based copolymer resin in the silane MB and/or the catalyst MB, and further using each of a specific amount to be added of the organic peroxide, the inorganic filler and the silane coupling agent, each passed in each of the heat deformation test, the hot set test, the heat aging test, and abrasion resistance test, as well as the extrusion outer appearance test.

From the comparison between Comparative Example 1 without any unsaturated carboxylic acid-modified ethylene-based copolymer resin and Example 1 containing the unsaturated carboxylic acid-modified ethylene-based copolymer resin in the silane MB, it is seen that abrasion resistance in particular is improved, by using, as a base rubber, the unsaturated carboxylic acid-modified ethylene-based copolymer resin in combination with the fluororubber. It is seen that the electric wire of Example 1 endures about 1.6 to about 5 times the number of round trips in the severe acceleration test, as compared to the electric wire of Comparative Example 1, and therefore life cycle of the electric wire of Example 1 as the electric wire in the practical use is greatly enhanced.

Examples 4 to 7 show that abrasion resistance in particular is excellent in a case where a combination of 60 to 97% by mass of the fluororubber and 3 to 40% by mass of the unsaturated carboxylic acid-modified ethylene-based copolymer resin is contained in the base rubber.

Further, a comparison between Examples 1 to 3 and Examples 8 to 10 shows that when the unsaturated carboxylic acid-modified ethylene-based copolymer resin is blended in the silane MB, heat resistance tends to be better.

Having described our invention as related to the embodiments and the examples, it is our intention that the invention not be limited by any of the details of the description, unless otherwise specified, but rather be construed broadly within its spirit and scope as set out in the accompanying claims.

This application claims priority on Patent Application No. 2018-131048 filed in Japan on Jul. 10, 2018, which is entirely herein incorporated by reference.

The invention claimed is:

1. A method of producing a heat-resistant crosslinked fluororubber formed body, including the following steps (1), (2) and (3):
   Step (1): a step of obtaining a reaction composition containing a silane crosslinkable rubber by melt-mixing, with respect to 100 parts by mass of a base rubber containing 60 to 99% by mass of a fluororubber and 1 to 40% by mass of an ethylene-based copolymer resin modified with an unsaturated carboxylic acid, 0.003 to 0.5 parts by mass of an organic peroxide, 0.5 to 400 parts by mass of an inorganic filler, 2 to 15 parts by mass of a silane coupling agent having a grafting reaction site that is capable of being subjected to a grafting reaction with said base rubber in the presence of radicals generated from said organic peroxide, and a silanol condensation catalyst,
   Step (2): a step of obtaining a formed body by forming the reaction composition, and Step (3): a step of obtaining the heat-resistant crosslinked fluororubber formed body by bringing the formed body into contact with water, wherein, when the step (1) is performed, in a case of melt-mixing all of the base rubber in the following step (a), the step (1) includes the following step (a) and step (c), or in a case of melt-mixing a part of the base rubber in the following step (a), the step (1) includes the following step (a), step (b) and step (c), and the ethylene-based copolymer resin modified with an unsaturated carboxylic acid is melt-mixed in at least one of the following steps (a) and (b):

Step (a): a step of preparing a silane masterbatch containing a silane crosslinkable rubber, by melt-mixing all or part of the base rubber, the organic peroxide, the inorganic filler and the silane coupling agent at a temperature equal to or higher than a decomposition temperature of said organic peroxide, and by graft-reacting the grafting reaction site and the base rubber due to radicals generated from said organic peroxide, Step (b): a step of preparing a catalyst masterbatch, by melt-mixing a remainder of the base rubber, and the silanol condensation catalyst, and Step (c): a step of obtaining the reaction composition, by melt-mixing the silane masterbatch and the silanol condensation catalyst or the catalyst masterbatch.

2. The method of producing a heat-resistant crosslinked fluororubber formed body according to claim 1, wherein the base rubber contains 60 to 97% by mass of the fluororubber and 3 to 40% by mass of the ethylene-based copolymer resin modified with an unsaturated carboxylic acid.

3. The method of producing a heat-resistant crosslinked fluororubber formed body according to claim 1, wherein the ethylene-based copolymer resin modified with an unsaturated carboxylic acid is melt-mixed in the step (a).

4. The method of producing a heat-resistant crosslinked fluororubber formed body according to claim 1, wherein the fluororubber includes a fluorinated vinylidene rubber or a tetrafluoroethylene/propylene copolymer rubber, or a combination thereof.

5. The method of producing a heat-resistant crosslinked fluororubber formed body according to claim 1, wherein the fluororubber is a tetrafluoroethylene/propylene copolymer rubber.

6. The method of producing a heat-resistant crosslinked fluororubber formed body according to claim 1, wherein the ethylene-based copolymer resin modified with an unsaturated carboxylic acid includes an ethylene/vinyl acetate copolymer resin modified with an unsaturated carboxylic acid, an ethylene/ethyl (meth)acrylate copolymer resin modified with an unsaturated carboxylic acid, or an ethylene/methyl (meth)acrylate copolymer resin modified with an unsaturated carboxylic acid, or a combination thereof.

7. The method of producing a heat-resistant crosslinked fluororubber formed body according to claim 1, wherein the ethylene-based copolymer resin modified with an unsaturated carboxylic acid is an ethylene/vinyl acetate copolymer resin modified with an unsaturated carboxylic acid.

8. The method of producing a heat-resistant crosslinked fluororubber formed body according to claim 1, wherein the base rubber includes an ethylene/vinyl acetate copolymer resin, an ethylene/(meth)acrylic acid ester copolymer resin, an ethylene/(meth)acrylic acid copolymer resin or an acrylic rubber, or a combination thereof.

9. The method of producing a heat-resistant crosslinked fluororubber formed body according to claim 1, wherein the inorganic filler includes silica, calcium carbonate, zinc oxide, or a calcined clay, or a combination thereof.

10. The method of producing a heat-resistant crosslinked fluororubber formed body according to claim 1, wherein the inorganic filler includes silica and zinc oxide.

11. The method of producing a heat-resistant crosslinked fluororubber formed body according to claim 1, wherein the base rubber contains a fluororesin.

12. The method of producing a heat-resistant crosslinked fluororubber formed body according to claim 1, wherein the remainder of the base rubber contains a fluororesin.

13. The method of producing a heat-resistant crosslinked fluororubber formed body according to claim 11, wherein a melting point of the fluororesin is 250° C. or less.

14. The method of producing a heat-resistant crosslinked fluororubber formed body according to claim 11, wherein the fluororesin includes an ethylene/tetrafluoroethylene/hexafluoropropylene copolymer resin, an ethylene/tetrafluoroethylene copolymer resin, or a polyfluorinated vinylidene resin, or a combination thereof.

15. The method of producing a heat-resistant crosslinked fluororubber formed body according to claim 11, wherein a content rate of the fluororesin is 3 to 15% by mass, with respect to 100% by mass of the base rubber.

16. A silane masterbatch for use in producing a masterbatch mixture prepared by mixing, with respect to 100 parts by mass of a base resin containing 60 to 99% by mass of a fluororubber and 1 to 40% by mass of an ethylene-based copolymer resin modified with an unsaturated carboxylic acid, a silane crosslinkable rubber grafted with a silane coupling agent of 2 to 15 parts by mass, 0.5 to 400 parts by mass of an inorganic filler with respect to 100 parts by mass of said base resin, and a silanol condensation catalyst, wherein the silane masterbatch includes the silane crosslinkable rubber subjected the silane coupling agent and the base rubber to a grafting reaction, by radicals generated from the organic peroxide, by melt-mixing all or part of the base rubber, said organic peroxide, the inorganic filler, and the silane coupling agent.

17. A masterbatch mixture containing the silane masterbatch according to claim 16 and a silanol condensation catalyst.

18. A heat-resistant crosslinked fluororubber formed body produced by the method of producing a heat-resistant crosslinked fluororubber formed body according to claim 1.

19. A heat-resistant product comprising the heat-resistant crosslinked fluororubber formed body according to claim 18.

20. The heat-resistant product according to claim 19, wherein the heat-resistant crosslinked fluororubber formed body is a coated layer of an electric wire or an optical fiber cable.

* * * * *